United States Patent
Goto et al.

[11] Patent Number: 5,989,124
[45] Date of Patent: Nov. 23, 1999

[54] TRIPOD TYPE CONSTANT VELOCITY UNIVERSAL JOINT

[75] Inventors: Tatuhiro Goto; Tsuyoshi Saito, both of Iwata; Masahiro Ozawa, Kosai; Haruo Nagatani, Iwata, all of Japan

[73] Assignee: NTN Corporation, Osaka, Japan

[21] Appl. No.: 08/894,792

[22] PCT Filed: Jan. 31, 1997

[86] PCT No.: PCT/JP97/00243

§ 371 Date: Sep. 9, 1997

§ 102(e) Date: Sep. 9, 1997

[87] PCT Pub. No.: WO97/29294

PCT Pub. Date: Aug. 14, 1997

[30] Foreign Application Priority Data

Feb. 5, 1996 [JP] Japan ................................ 8-19106
Feb. 5, 1996 [JP] Japan ................................ 8-019106
Dec. 26, 1996 [JP] Japan ................................ 8-347612
Dec. 26, 1996 [JP] Japan ................................ 8-347647
Dec. 26, 1996 [JP] Japan ................................ 8-347655

[51] Int. Cl.$^6$ ............................................. F16D 3/205
[52] U.S. Cl. ........................ 464/111; 464/132; 464/905
[58] Field of Search ................................ 464/111, 120, 464/122, 123, 124, 132, 905

[56] References Cited

U.S. PATENT DOCUMENTS

| | | |
|---|---|---|
| 4,472,156 | 9/1984 | Orain ................................ 464/905 |
| 4,565,540 | 1/1986 | Orain ................................ 464/124 |
| 4,589,856 | 5/1986 | Mazziotti et al. .................. 464/905 |
| 4,810,232 | 3/1989 | Farrell et al. ..................... 464/111 |
| 5,203,741 | 4/1993 | Turner et al. ..................... 464/123 |
| 5,330,389 | 7/1994 | Jost et al. ......................... 464/111 |
| 5,362,275 | 11/1994 | Girguis ............................ 464/124 |
| 5,391,013 | 2/1995 | Ricks et al. ...................... 464/111 |
| 5,474,500 | 12/1995 | Girguis ............................ 464/111 |
| 5,591,085 | 1/1997 | Stall et al. ........................ 464/111 |
| 5,791,995 | 8/1998 | Kudo et al. ....................... 464/111 |

FOREIGN PATENT DOCUMENTS

| | | | |
|---|---|---|---|
| 4408812 | 9/1994 | Germany ................... | 464/111 |
| 2273332 | 6/1994 | United Kingdom ......... | 464/111 |

*Primary Examiner*—Eileen Dunn Lillis
*Attorney, Agent, or Firm*—Nikaido, Marmelstein, Murray & Oram LLP

[57] ABSTRACT

A tripod type constant velocity universal joint comprises a tripod member (4) having three radially protruding trunnions (5), each of which rotatably carries a roller (7) with cylindrical rolling elements (6) therebetween. The outer circumferential surface of the trunnion (5) assumes a true spherical surface (m) having its center on the axis of the trunnion (5) or is defined with a combination of true spherical surfaces ($m_1$) lying at both axial end portions of the trunnion (5) and having its center on the axis of the trunnion and an intermediate curved surface ($m_2$, $m_3$) standing between the true spherical surfaces ($m_1$) and having a radius of curvature larger than those of the true spherical surfaces.

12 Claims, 18 Drawing Sheets

FIG.18

| CONDITION | ROLLING ELEMENT SPECIFICATION | OPERATING TIME (HOURS) |
|---|---|---|
| A | CONVENTIONAL | x (10) |
| A | CONVENTIONAL | x (40) |
| A | INVENTIVE | x (88) |
| B | CONVENTIONAL | x (96) |
| B | INVENTIVE | >> (160) |
| B | INVENTIVE | >> (160) | x: POOR CONDITION
>>: GOOD CONDITION

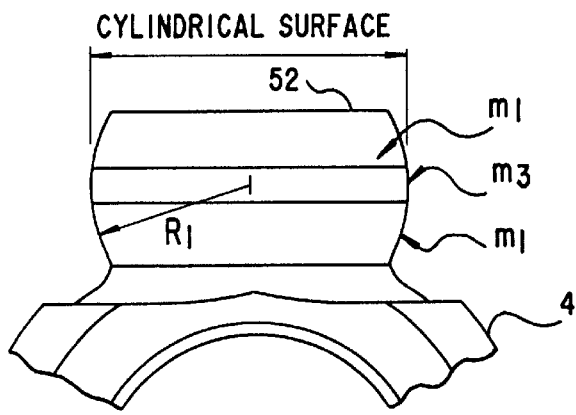
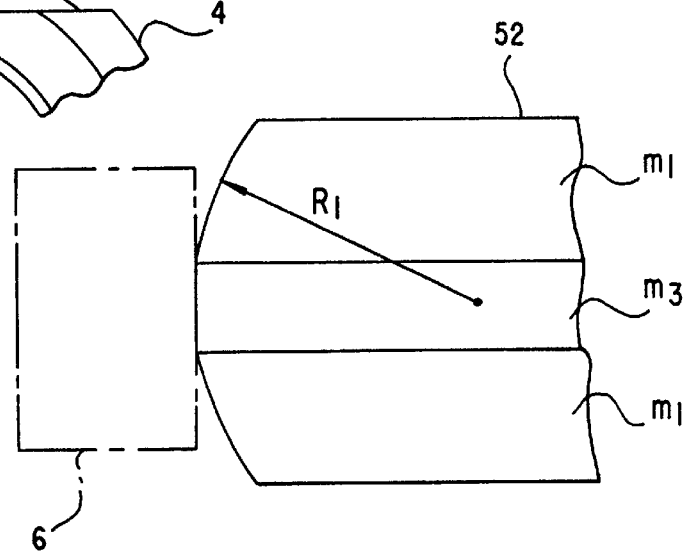
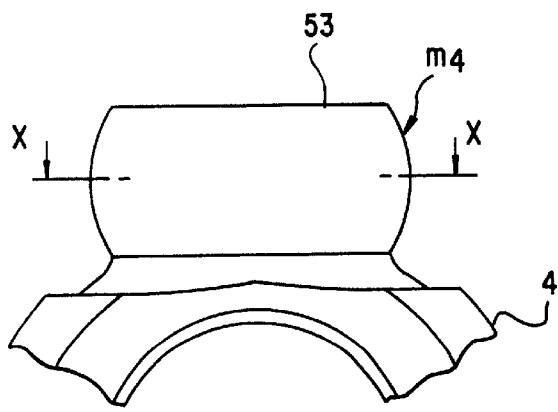
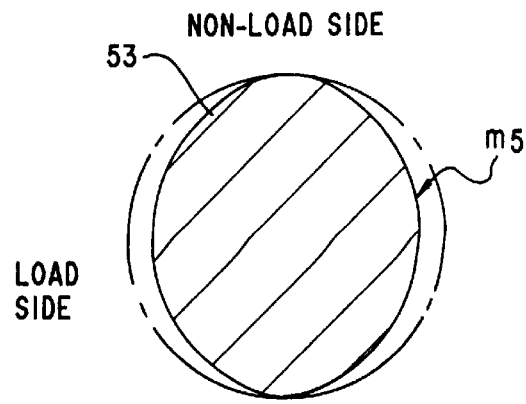

d1>d2

TRIPOD TYPE CONSTANT VELOCITY UNIVERSAL JOINT

TECHNICAL FIELD

The present invention relates to a tripod type constant velocity universal joint which is applicable to front-wheel drive vehicles and others.

BACKGROUND ART

In front-wheel drive vehicles, as a constant velocity universal joint for transmitting torque from a drive shaft to front wheels at a constant velocity, there has been taken a joint of a tripod type as shown in FIGS. 8A and 8B. In this tripod type, a tripod member 4 has three radially protruding trunnions 11, which carry rollers 13 respectively rotatably fitted through rolling elements 12 over cylindrical outer circumferential surfaces of the trunnions 11, is inserted into an outer member 1 having three cylindrical track grooves 2 formed in an inner surface of and extending axially of the outer member 1. Each of the rollers 13 is accommodated in the corresponding track groove 2 so that it may travel along the track groove 2 rotating about an axis of the trunnion with an outer circumferential surface in engagement with one of a pair of side walls of the track groove 2, which walls provide roller guide surfaces 3 opposing circumferentially of the outer member 1.

In cases where as shown in FIG. 9 the transmission of torque is made in a state that the outer member 1 and the tripod member 4 make a working or operating angle $\theta$ with respect to each other, each of the rollers 13 and one of the roller guide surfaces 3 of the corresponding track groove 2 come into an obliquely intersecting relation to each other as shown in FIG. 10. In this case, although the roller 13 tends to roll and move in a direction indicated by an arrow a in FIG. 9, because the track groove 2 has a cylindrical configuration parallel to the axial direction of the outer member 1, the roller 13 results in moving while undergoing restriction. Accordingly, the roller 13 slips in relation to the roller guide surface 3 so that the evolution of heat occurs and an axial induced thrust takes place. This induced thrust causes the occurrence of vibration of a vehicle body and the generation of noises, and hence the more reduced induced thrust is desirable.

For a tripod type constant velocity universal joint which is capable of reducing the aforesaid induced thrust to a certain extent, there has been known a two-story construction type comprising a combination of an inner ring and an outer ring as a roller (U.S. Pat. No. 4,786,270). For instance, as shown in FIGS. 11 and 12, in this type of joint, an inner ring 18 is rotatably fitted through rolling elements 12 over a cylindrical outer circumferential surface of a trunnion 11 of a tripod member 4 while an outer ring 19 is rotatably fitted over an outer circumferential surface of the inner ring 18, thus producing a two-story construction. The inner ring 18 has a true-spherical outer circumferential surface 18a with its center on the axis of the trunnion 11, and a cylindrical inner circumferential surface 19a of the outer ring 19 is rotatably fitted over the true-spherical outer circumferential surface 18a. The outer ring 19 is accommodated in the track groove 2 of the outer member 1 so that it may travel in the axial direction of the outer member 1 rolling on a roller guide surface 3 of the track groove 2. In the case that the transmission of torque is made in a state where the outer member 1 and the tripod member 4 make a working angle as shown in FIG. 12, the inner ring 18 is inclined with respect to the outer ring 19, where the inner ring 18 relatively shifts downwardly in FIG. 12 in relation to the cylindrical inner circumferential surface 19a of the outer ring 19. Owing to the occurrence of the relative movement between the inner and outer rings 18, 19, the outer ring 19 is guided along roller guide surfaces 3 of the outer member 1 while maintaining a position parallel to the axial direction of the outer member 1, with the result that it correctly rolls on the roller guide surface 3 with less sliding friction. Thus, the sliding resistance is reducible to suppress the generation of the induced thrust.

In addition, as another tripod type constant velocity universal joint which can reduce, though to a certain extent only, the aforesaid induced thrust, there has been known a type in which a roller is pivotably supported with an outer circumferential surface of a trunnion of a tripod member (U.S. Pat. No. 4,379,706). As shown in FIGS. 13 and 14, this joint features that an outer circumferential surface 22 of a trunnion 21 of a tripod member 4 assumes a curved surface with a gentle curvature. In this case, a cylindrical inner circumferential surface of a roller 24 is pivotably fitted through rolling elements 23 over the outer circumferential surface 22 of the trunnion 21 having the gentle curvature. The roller 24 is accommodated in a track groove 2 of an outer member 1 so that it may travel along the track groove 2. Also in the joint as shown in FIG. 13, when the transmission of torque is made in a state where the outer member 1 and the tripod member 4 make a working angle $\theta$ as shown in FIG. 14, the cylindrical inner circumferential surface of the roller 24 gets into inclination to the outer circumferential surface 22 of the trunnion 21 and the roller 24 more or less pivots relative to the trunnion 21, which allows the roller 24 to be guided by roller guide surfaces on both sides of the track groove 2 of the outer member 1 to be somewhat in parallel to the axis of the outer member 1. Thus, the roller 24 rolls on the roller guide surface 3 in the axial direction of the outer member 1 so that the sliding resistance of the roller 24 is reducible to lessen the induced thrust.

In the joint with a two-story roller construction as shown in FIG. 11, there has been known the fact that it is possible to stably produce the induced thrust reduction effect when operating in a state with making the working angle. However, this is disadvantageous in that, because the roller is constructed with a combination of an inner ring and an outer ring, in addition to the number of parts for the roller section the number of assembling steps increases to cause the rise of its manufacturing cost. In the case of the FIG. 13 joint, the roller has a simple (one-story) construction as well as the basic structure shown in FIGS. 8A and 8B, so that the rise of the manufacturing cost is avoidable. On the other hand, in this joint, even if the outer member 1 and the tripod member 4 make the working angle $\theta$ as shown in FIG. 14, it is necessary that, to permit the roller 24 to always maintain the position parallel to the track groove 2, a desirable radial gap g (not shown in the illustration) be defined between the outer circumferential surface 22 of the trunnion 21 and the rolling elements 23. More specifically, as shown in FIG. 15A the radius of curvature (approximate value) in the central portion of the gentle curvature outer circumferential surface 22 of the trunnion 21 is taken to be R and its outer diameter is taken as 2r. When the trunnion 21 is inclined by a working angle $\theta$ as shown in FIG. 15B, the outer circumferential surface 22 comes into contact with the rolling elements 23 at the portions C, C' where it meets with a chain line b and a chain line c. Since these two portions C, C' stand on the radius $[R-(R-r)\cos\theta]$ larger than the radius r of the central portion, in order to permit the trunnion 21 to smoothly tilt with respect to the roller 24, it is required that as the angle allowing for the tilting therebetween the radial gap g be set to a given value to satisfy $g=2\{[R-(R-r)\cos \theta]-r\}=2(R-r)(1-\cos \theta)$. In this case, since the radial gap g is proportional to the looseness of the universal joint in its circumferential direction, it is desirable to decrease it to the utmost. Accordingly, in the FIG. 13 joint, difficulty is experienced to maintain the roller 24 to take a position parallel to the track groove 2 at all the required values of working angle $\theta$ unless the looseness is allowed to increase.

DISCLOSURE OF INVENTION

It is therefore a principal object of the present invention to provide a tripod type constant velocity universal joint with a high performance which is capable of surely reducing the looseness and the induced thrust when operating in a state with making a working angle.

In accordance with one aspect of the present invention, a tripod type constant universal joint comprises rollers rotatably carried, through cylindrical rolling elements, on three trunnions of a tripod member are accommodated, respectively, in thrack grooves formed in an inner circumferential surface of an outer member in an axial direction, so that the rollers are movable axially of the outer member along roller guide surfaces at opposite sides of each of the track grooves and extending axially of the outer member, wherein an inner circumferential surface of the roller is cylindrical, and wherein a generatrix of an outer circumferential surface of the trunnion is defined with a combination of circular arcs at opposite ends of the trunnion and a curve between the circular arcs, the circular arcs having one and same center of curvature on the axis of the trunnion to constitute a part of a true circle, the curve having a radius of curvature larger than that of the circular arcs to be smoothly joined to the circular arcs.

In this case, the term curve may also be a substantially straight line which corresponds to the curve whose radius of curvature is enlarged up to infinity. Further, in cases where the axial central portion of the generatrix on the outer circumferential surface of the trunnion is defined to be literally the curve, it is also possible to employ not only a circular arc having a single center of curvature and a single radius of curvature but a combination of a plurality of circular arcs different in center of curvature and radius of curvature from each other. In the case of employing the combination of a plurality of circular arcs for the axially central portion, those which are closer to the circular arcs at both ends of the trunnion and constituting a part of a true circle may have a center of curvature at a position nearer to that of the circular arcs constituting a part of a true circle so that a smoothly continuous generatrix is attainable on the outer circumferential surface of the trunnion.

In this instance, the intermediate portion of the outer circumferential surface of the trunnion assumes a curved surface with a gentle curvature than the true spherical surface, and in the case that the radius of curvature of the intermediate portion is infinite, it assumes a substantially cylindrical surface parallel to the axial direction of the trunnion just as mentioned previously. When the rolling element is always brought into contact with the intermediate curved surface including such a substantially cylindrical surface, its maximum surface (bearing) pressure is reducible than the maximum surface pressure taking place at the contact of a true spherical surface, and accordingly the local carrying capacity increases so that the durability improves.

When the generatrix of the outer circumferential surface of the trunnion is constituted by a circular arc having a single center of curvature and a single radius of curvature, the outer circumferential surface of the trunnion is true spherical with the center of curvature on the axis of the trunnion. The roller fitted over the true spherical outer circumferential surface of the trunnion is one in number to define the so-called one-story construction, and the true spherical outer circumferential surface of the trunnion is fitted through a plurality of rolling elements in the cylindrical inner circumferential surface of the roller. In this case, since the outer circumferential surface of the trunnion takes a true spherical surface, unlike the prior art the radial gap is not required to be defined between the rolling elements and the outer circumferential surface. That is, the trunnion can freely pivot or tilt with respect to the roller, and irrespective of the magnitude of the tilting angle the relation in dimension between the outer circumferential surface of the trunnion and the rolling elements is always kept constant. Accordingly, when the joint takes a working angle, the true spherical outer circumferential surface of the trunnion of the tripod member relatively rotates about its center of curvature and moves with respect to the cylindrical inner circumferential surface of the roller fitted in the track groove of the outer member to cause the roller to relatively shift in the axial direction of the track groove. In consequence, the generation of the induced thrust is suppressible as well as the prior joint with the two-story construction, thus providing a tripod type constant velocity universal joint with high quality and performance which can develop less occurrence of temperature rise, vibration, and noise. In addition, since the reduction of the induced thrust developed at the time that the joint works in a state with making a working angle is realizable using a tripod member with a simple one-story roller structure, the tripod type constant velocity universal joint with high quality and performance is producible at a lower manufacturing cost.

In order to more certainly stabilize the position of the roller in the axial direction of the outer member at the time that the joint operates in a state with making a working angle, angular contact may be established between the roller guide surface of the track groove of the outer member and the outer circumferential surface of the roller. A shoulder may be formed along the roller guide surface for engagement with an end surface of the roller to thereby limit the rolling direction of the roller to a direction parallel to the track groove. With these constructions, the angular contact between the roller guide surface of the track groove of the outer member and the outer circumferential surface of the roller or the shoulder of the roller guide surface stably makes a limitation of the movement of the roller to travel in the axial direction of the outer member when the joint operates in a state with making a working angle, with the result that the generation of the induced thrust is more surely and stably suppressible.

Although it has been known that the strength of the tripod type constant velocity universal joint greatly depends upon the strength of the roller and the strength of the rolling elements, if (geometrical moment of inertia of the roller/$PCD^4$) is set to exceed $0.0281 \times 10^{-3}$ but be below $1.39 \times 10^{-3}$, and (the diameter of the rolling elements/PCD) is set to exceed 0.0417 but be below 0.378, it is possible to sufficiently satisfy the strength required for the joint for use in a drive system of a motor vehicle. Accordingly, in this case, it is possible to obtain proper dimensions which meet the strength being required and, therefore, to provide a tripod type constant velocity universal joint which can sufficiently satisfying the strength required in using it for a drive system of a motor vehicle.

The transverse cross section of the trunnion is usually a true circle, whereas it may also be an ellipse with its minor axis pointing the load side. In this case, it is preferable from a manufacturing point of view that the difference between its minor axis and its major axis is approximately several tens to 100 $\mu$ and in all the cross-sections perpendicular to the axis of the trunnion the ellipticity is the same. With such an elliptic surface that its minor axis points the load side of the outer circumferential surface of the trunnion, the stress concentration to the rolling element receiving the load when coming into contact with that surface can be softened, thus further improving the maximum surface pressure and the durability. In addition, the configuration of the outer circumferential surface in the longitudinal section of the trunnion can also comprise a combination of circular arcs at opposite ends of the trunnion with a center of curvature on the axis of the trunnion and a curve between the circular arcs smoothly connected to the circular arcs and having a radius of curvature larger than that of the circular arcs. It is also possible that this curve is made up of a combination of a plurality of circular arcs different in center of curvature and radius of curvature from each other or is made as a substantially straight line corresponding to an arc having an infinite radius of curvature. Accordingly, the axial central portion of the trunnion coming into contact with the rolling elements at the maximum surface pressure is formed with a gentle curved surface having a radius of curvature larger than that of a true spherical surface having a center of curvature on the axis of the trunnion, and hence the surface pressure on the rolling element is reducible.

In accordance with another aspect of this invention, a tripod type constant velocity universal joint comprises a tripod member having three radially protruding trunnions each of which rotatably carries a roller fitted over an outer circumferential surface of the trunnion with a plurality of cylindrical rolling elements therebetween, and an outer member having three track grooves formed in an inner circumferential surface thereof for receiving the trunnions, respectively, so that each of the rollers may travel axially of the outer member rolling on a roller guide surface of the track groove. A stopper may be provided on an inner circumferential surface of the roller to prevent the plurality of cylindrical rolling elements from falling out in their axial direction.

The stopper may be in the form of an annular step inwardly protruding from the inner circumferential surface of the roller, or alternatively, the stopper may be in the form of a washer attached to an annular groove formed in the inner circumferential surface of the roller, simplifying the roller in structure. Since the stopper is provided on the roller inner circumferential surface, it becomes unnecessary that the parts or structure for preventing the rolling elements from falling out be provided on the trunnion of the tripod member, and hence the number of parts for the tripod member and the number of steps for the assembling decrease and, in addition, the following assembling methods may be adopted for the tripod member. That is, in the manufacturing process for the tripod type constant velocity universal joint, a stopper is provided on an inner circumferential surface of a roller of a tripod member to prevent a plurality of successive cylindrical rolling elements from falling out in their axial direction, and the roller, together with the rolling elements, is fitted over a trunnion in a state where the plurality of rolling elements are temporarily attached with a grease on the roller inner circumferential surface along the stopper. Alternatively, a stopper is provided on an inner circumferential surface of a roller of a tripod member to prevent a plurality of cylindrical rolling elements from coming out in their axial direction, and the plurality of rolling elements but one are successively or serially arranged on the roller inner circumferential surface along the stopper and the remaining one rolling element is forced into a gap left between the two of the series of rolling elements positioned at both the ends thereof, and further the roller, together with the rolling elements, is fitted over the trunnion in a state where a given number of rolling elements are temporarily held on the roller inner circumferential surface. In the former manufacturing method, the rolling elements are temporarily adhered with a grease onto the roller inner circumferential surface, and the stopper of the roller prevents the rolling elements from coming out when the roller, together with the rolling elements, is fitted over the trunnion of the tripod member. The latter manufacturing method for serially arranging the rolling elements on the roller inner circumferential surface is the so-called Keystone method using no adhesive, and also in this instance the stopper of the roller prevents the rolling elements from falling out when the roller, together with the rolling elements, is fitted over the trunnion of the tripod member. According to both the manufacturing methods, since the roller and the rolling elements are integrally and simultaneously combined with the trunnion, the number of steps for assembling the tripod member can decrease and assembling work efficiency can improve, thus providing a tripod type constant velocity universal joint which is excellent in quality production and low in cost.

Referring to the drawings, a description will be made hereinbelow of concrete examples according to the present invention. The same parts or corresponding parts are marked with the same reference numerals throughout all the drawings and the double description of the same parts will be omitted.

BRIEF DESCRIPTION OF DRAWINGS

FIG. 18 is a bar chart of durability test results;

FIG. 21A is a partial front elevational view showing a tripod member;

FIG. 21B is a partial enlarged illustration of a trunnion shown in FIG. 21A;

FIG. 22A is a partial front elevational view showing a tripod member;

FIG. 22B is a cross-sectional view taken along a line X—X of FIG. 22A;

BEST MODE FOR CARRYING OUT THE INVENTION

Figures 1A, 1B:
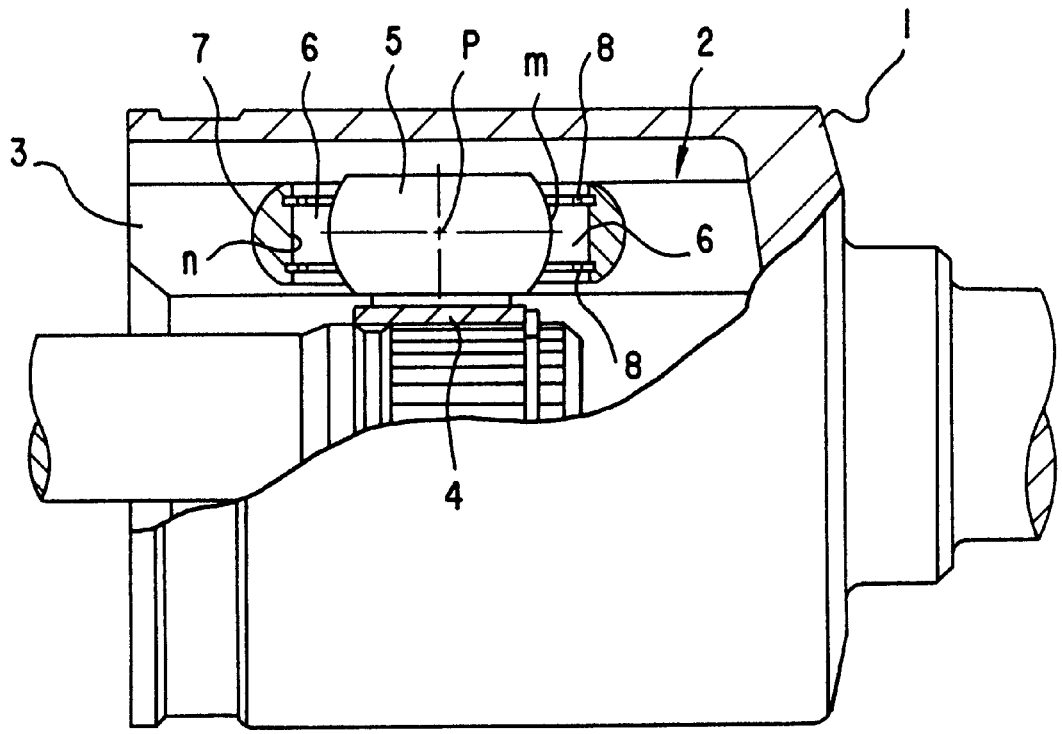
FIG. 1A is a front elevational view in part in section of a tripod type constant velocity universal joint according to the invention.
FIG. 1B is a partial cross-sectional view of the FIG. 1A joint.

Referring first to FIGS. 1A and 1B, a tripod type constant velocity universal joint comprises an outer member 1 adapted to connect with one of two rotary axes being coupled together by the joint and a tripod member 4 adapted to connect with the other of the two axes. The outer member 1 is generally cup-shaped and has three circumferentially equispaced, axially extending track grooves 2 formed in an inner circumferential surface. The tripod member 4 has three circumferentially equispaced, radially protruding trunnions 5, each of which rotatably carries a roller 7 with rolling elements therebetween. The rollers 7 are respectively accommodated in the track grooves 2 of the outer member. The rollers 7 have cylindrical inner circumferential surface n which is fitted through the plurality of rolling elements 6 over an outer circumferential surface m of the trunnion, which surface m in turn is a part of a true sphere with its center p of curvature on the axis of the trunnion 5. As illustrated the rolling elements 6 have a cylindrical rolling surface whose diameter is relatively large and whose length is not very long as compared with its diameter. In this respect, the rolling elements 6 are in contrast to needle rollers. Washers 8 are attached to both opening end portions of the inner circumferential surface n of the roller to prevent the rolling elements 6 from falling out.

Figure 2:
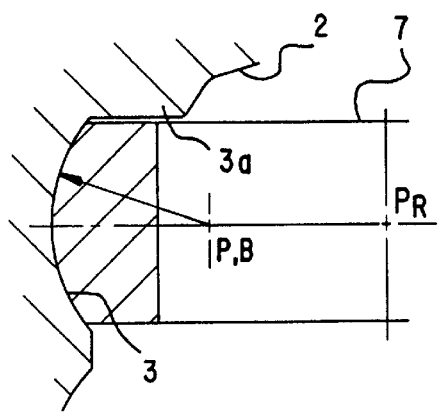
FIG. 2 is a partial enlarged cross-sectional view of the FIG. 1B joint showing a form of a roller and a roller guide surface.
Figure 3:
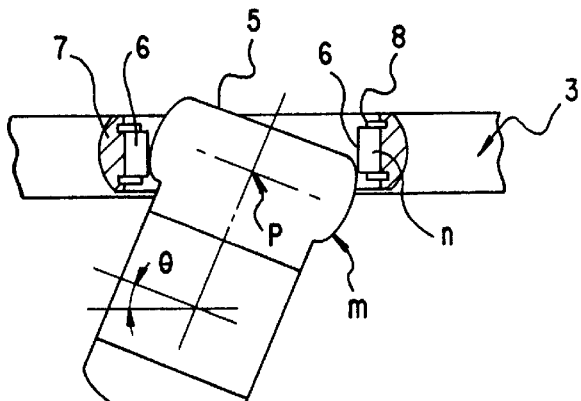
FIG. 3 is a sectional view schematically showing the FIG. 1 joint in a state with making a working angle.
Figure 11:
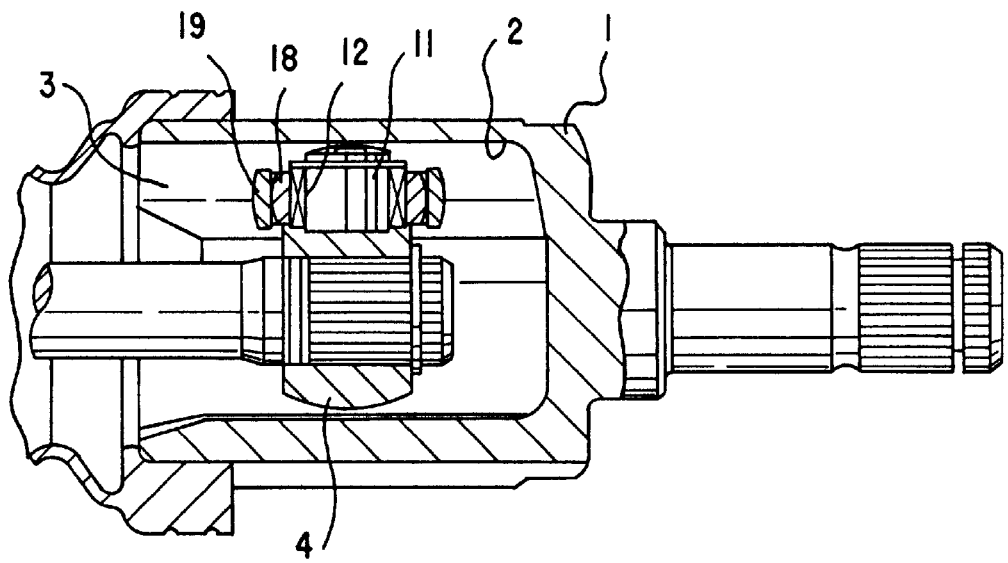
FIG. 11 is a longitudinal cross-sectional view showing another conventional tripod type constant velocity universal joint.
Figure 12:
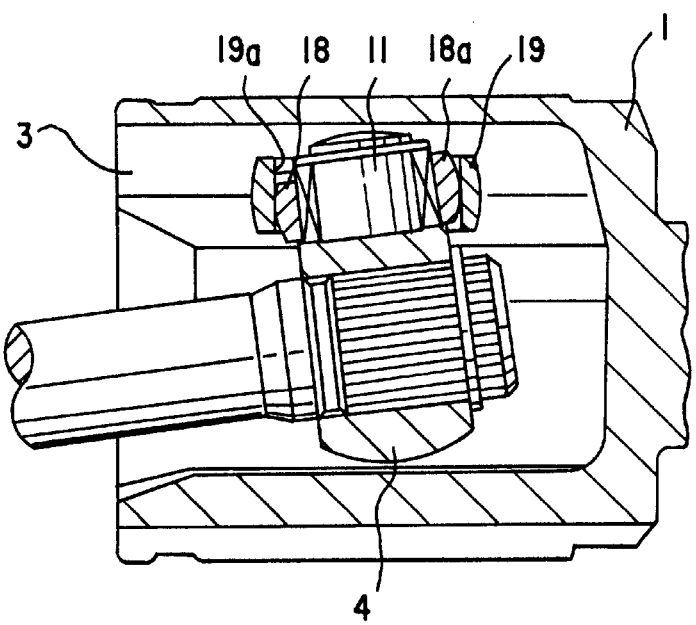
FIG. 12 is a longitudinal cross-sectional view showing the FIG. 11 joint in a state with making a working angle.
Figure 13:
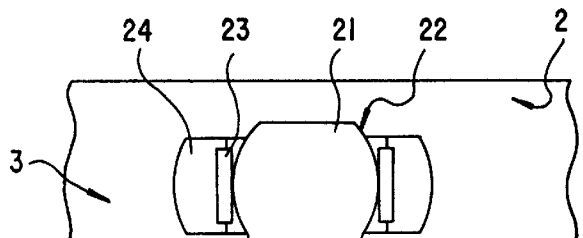
FIG. 13 is a sectional view schematically showing a principal portion of a different conventional tripod type constant velocity universal joint.
Figure 14:
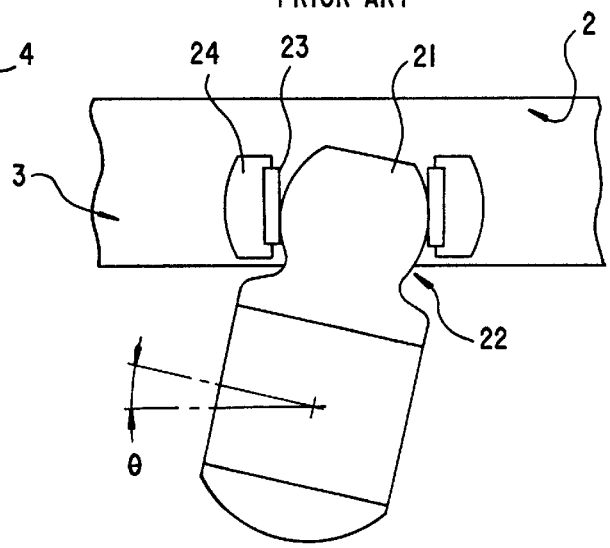
FIG. 14 is a sectional view schematically showing a main portion of the FIG. 13 joint in a state with making a working angle.
Figure 15B:
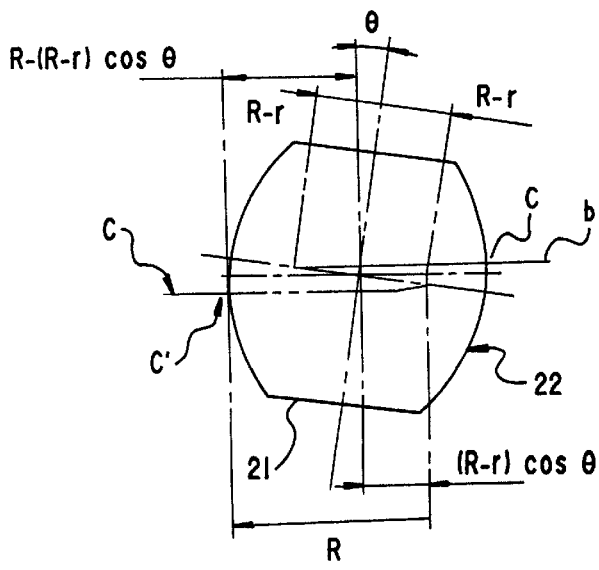
FIG. 15B is a front elevational view showing a trunnion of the FIG. 14 joint.
Figure 15A:
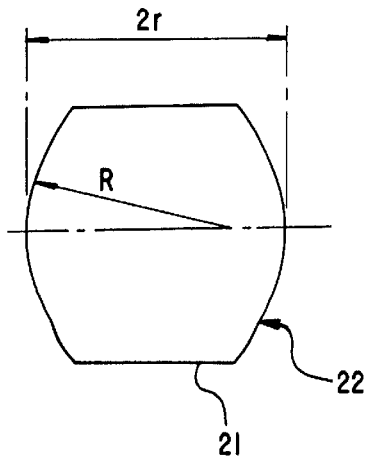
FIG. 15A is a front elevational view showing a trunnion of the FIG. 13 joint.

As will be seen from FIGS. 1B and 2, the gereratrix of an outer circumferential surface of the roller 7 is a circular arc having its center of curvature at point p spaced apart radially outwardly from the center $P_R$ of the roller. The track grooves 2 accommodating the rollers 7 extend axially of the outer member 1. A pair of side walls of each of the track grooves 2 oppose each other circumferentially of the outer member 1 and provide roller guide surfaces 3 for engagement with the outer circumferential surface of the roller 7. In FIGS. 1B and 2 each of the roller guide surfaces 3 is a cylindrical surface with its axis passing point p spaced apart radially outwardly form the center $P_R$ of the roller 7. Since the generatrix of the outer circumferential surface of the roller 7 is a circular arc having its center of curvature at a point spaced apart from the center of the roller 7, the roller 7 can hardly incline as viewed in the longitudinal section (FIG. 1A) but runs parallel with the direction in which the roller guide surface 3 extends, i.e. the axial direction of the outer member 1, ensuring that the roller 7 smoothly rolls on the roller guide surface 3. This is also applicable where the axes being coupled together by the joint are at an angle or the working angle. As shown in FIG. 3, when the joint makes a working angle θ, the tripod member 4 is inclined by an angle θ with respect to the outer member 1. At this time, the true-spherical outer circumferential surface m of the trunnion 5 relatively rolls and moves within the cylindrical inner circumferential surface n of the roller 7 (through the rolling elements 6), while the roller 7 rolls and moves along the roller guide surfaces 3 within the track groove 2 while taking a position parallel to the axis of the outer member 1, and in this situation the sliding resistances at the respective portions come down to suppress the occurrence of the induced thrust. The mechanism to reduce the induced thrust when operating in a state with making a working angle is basically the same as that of the two-story roller construction as shown in FIGS. 11 and 12, and a description thereof will be taken hereinbelow with reference to FIG. 4.

Figure 4:
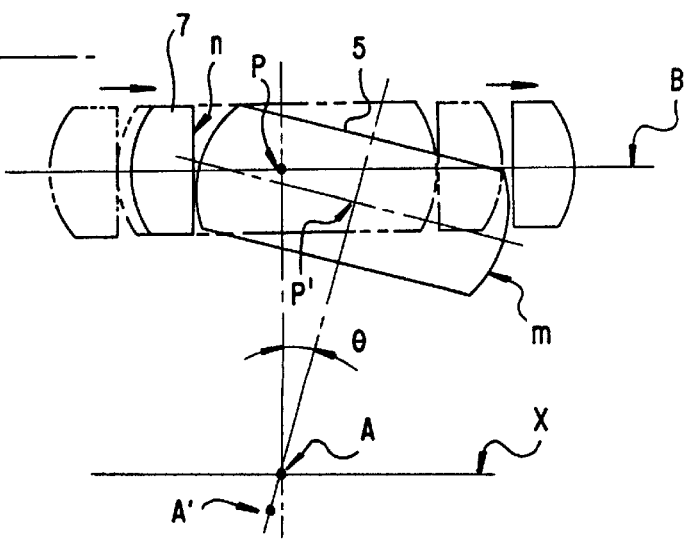
FIG. 4 is a schematic illustration for describing a relative movement between a roller and a trunnion as shown in FIG. 3.

As indicated by a two-dot chain line in FIG. 4, when the center of the tripod member 4 at the time of not making a working angle is taken as A, this center A lies on the axis X of the outer member 1, and the center P of the true-spherical outer circumferential surface m of the trunnion 5 and the roller 7 stands on the center line B of the roller guide surface 3. On the other hand, as shown by a solid line in FIG. 4, when the joint makes a working angle θ, the center A of the tripod member 4 shifts to a point A' to move downwardly from the axis X in FIG. 4. Consequently, the axis of the trunnion 5 is inclined by an angle θ, whereas the center P of the true-spherical outer circumferential surface m relatively moves downwardly from the center line B of the roller guide surface 3 up to a position P' in FIG. 4. Owing to this relative movement and the inclination of the trunnion 5, the true-spherical outer circumferential surface m of the trunnion 5 tends to move on the cylindrical inner circumferential surface n of the roller 7 while rotating about the center P, besides this movement is smooth due to the interposition of the rolling elements 6 (omitted in FIG. 4 for clarity; see FIG. 3) therebetween. In accordance with the movement of the trunnion 5, the roller 7 rolls and moves along the roller guide surface 3 to shift in the direction of the axis X of the outer member 1 parallel to the center line B of the roller guide surface 3 as indicated by an arrow pointing to the right in the illustration. Thus, the relative movement between the trunnion 5 and the roller 7 and the relative movement between the roller 7 and the roller guide surface 3 are achievable with extremely low resistances, with the result that the occurrence of the induced thrust is suppressible.

In order to ensure that the roller 7 runs parallel with and rolls on the roller guide surface 3 with a lesser resistance, a shoulder 3a may advantageously be formed so as to extend axially of the outer member 1 along an upper edge of the roller guide surface 3. The roller 7 always comes into contact at an end surface thereof with the shoulder 3a, and therefore, maintains its position in parallel to the axis of the outer member 1. Thus the roller 7 is guided axially of the outer member 1 as it travels along the roller guide surface 3, resulting in the position of the roller 7 being effectively stabilized even when the joint operates in a state with making a working angle.

Figure 5:
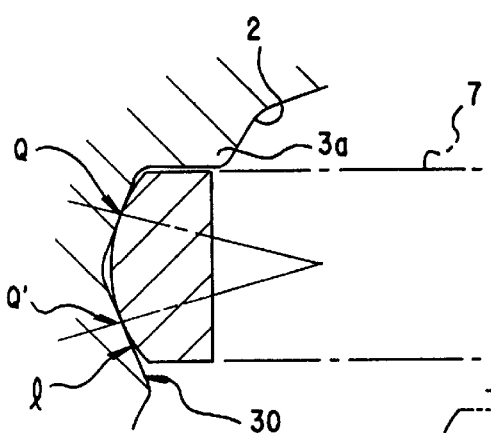
FIG. 5 is a partial enlarged cross-sectional view similar to FIG. 2, showing a modification of a roller guide surface.

The roller guide surface 3 may be of any shape including the cylindrical shape as described previously. In a modification shown in FIG. 5 the angular contact fashion is adopted in which the outer circumferential surface I of the roller 7 and the roller guide surface 30 come in contact at two points Q and Q' spaced apart axially of the roller 7. Also this arrangement allows the roller 7 to run parallel with the direction in which the roller guide surface 30 extends, that is, the axial direction of the outer member 1. The gap or space confined by the roller guide surface 30 and the roller outer circumferential surface between the two contact points Q and Q' effectively serves as a grease pocket. In this case, the gereratrix configuration of the roller guide surface 30 can assume a Gothic arch, an ellipse, a parabola, hyperbola or the like. The gereratrix configuration of the outer circumferential surface of the roller 7 can be defined, for example, with a circular arc having a center of curvature on the axis of the roller 7, a circular arc having a center of curvature at a point radially spaced apart from the axis of the roller, either towards or away from the outer circumferential surface of the roller, or a combination of circular arcs having centers of curvature at points spaced apart from each other in the axial direction of the roller 7.

Figure 6:
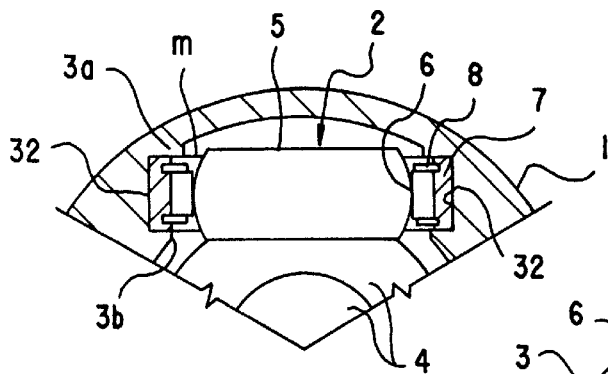
FIG. 6 is a cross-sectional view similar to FIG. 1B, showing a modification of a roller guide surface.

FIG. 6 shows a modification in which a pair of opposing roller guide surfaces 3 constituting side walls of the track groove 2 are parallel flat surfaces. Along upper and lower edges of each roller guide surface are formed shoulders 3a and 3b, so that a fringing portion of the roller 7 is fitted between the pair of shoulders 3a, 3b, and the cylindrical outer circumferential surface of the roller 7 is engaged with the flat roller guide surfaces 32. In this instance, both the end surfaces of the roller 7 engage with the shoulders 3a, 3b, with the result that the position of the roller 7 in the axial direction of the outer member 1 is stably controllable.

Figure 7:
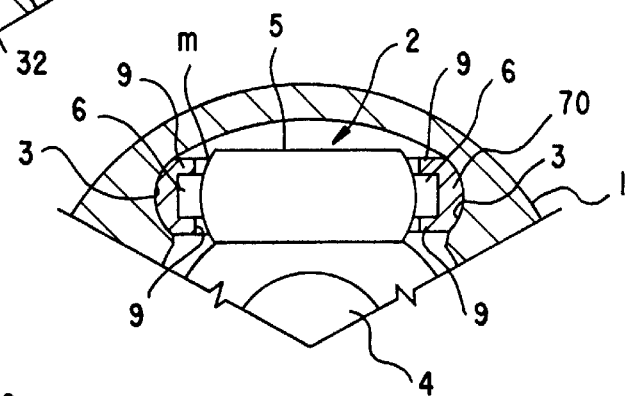
FIG. 7 is a cross-sectional view similar to FIG. 1B, showing a modification of a roller.

As shown as a modification in FIG. 7, it is also appropriate that annular flanges 9 are integrally formed at both ends of the cylindrical inner surface of the roller 70 to support the rolling elements 6. With this construction, it is possible to omit the washers 8 for preventing the rolling elements from coming out, which can decrease the number of parts for the roller section.

For using the constant velocity universal joint in a drive system of a motor vehicle, a strength is required which can withstand the drive torque. In general, in the case of the constant velocity universal joint, the strength taken as a criterion or reference depends upon, for example, the strength of a shaft to be coupled to this constant velocity universal joint. Accordingly, for a tripod type constant velocity universal joint (see FIG. 16) of the type that the trunnion 5 has a true-spherical outer circumferential surface as previously described, a strength test was made from the viewpoint of determining dimensional requirements to satisfy a strength condition. As a result of the test, it was found that two points: the strength of the roller 7 and the strength of the rolling elements 6, exerted influence. For the evaluation, the obtained test result (the strength of the constant velocity universal joint) was divided by the static twisting strength of the shaft to obtain a value c (equation 1) which in turn, was employed as a criterion, and c>0.93 was determined for clearing the condition. That is, $$c = \text{the strength of the joint/the static twisting strength of the shaft} \quad \text{(equation 1)}$$

The geometrical moment of inertia of the roller 7 greatly has influence on the strength of the roller 7, and the strength of the rolling elements 6 relies upon the diameter of the rolling elements. In order to exclude influence from the sizes (the type number of the joint), the respective dimensions were divided by pitch diameter (herein after PCD) for dimensionless, thus attaining the following conditional equations (2) and (3).

$$a = \text{(the geometrical moment of inertia of area of the roller/PCD}^4) \quad \text{(equation 2)}$$

$$b = \text{the diameter of the rolling elements/PCD} \quad \text{(equation 3)}$$

Figure 17:
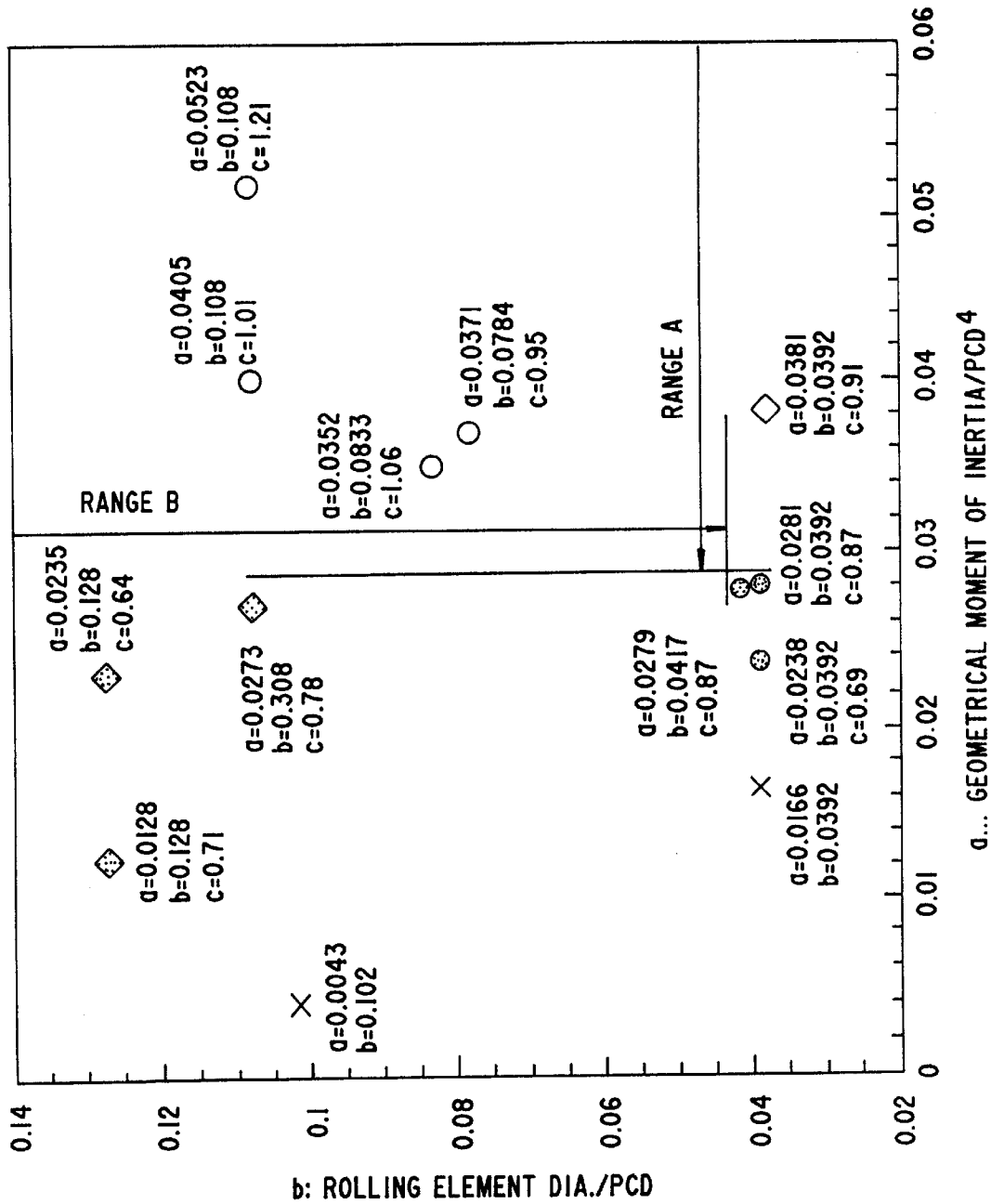
FIG. 17 is a graphic illustration drawn by plotting strength test results.

FIG. 17 is an illustration obtained by plotting test data on a plurality of tested joints different in values a and b, where the horizontal scale represents the value a while the vertical scale denotes the value b. Each of the test data includes a mark indicative of an evaluation and values a, b and c. Of the marks representative of the evaluations, the white circle ○ represents "strength OK", that is, satisfying the condition of c>0.93, the white lozenge ◇ designates "rolling element no good (NG)", that is, signifying that the rolling element is in poor condition, the black lozenge ◆ denotes that the roller is in poor condition, the black circle ● depicts "roller and rolling element NG", that is, meaning that both the roller and rolling element are in poor condition, and the cross x stands for "obviously NG", that is, signifying that the shortage of the strength is obvious without making the test.

As found from FIG. 17, the range of the value of the conditional equation a (equation 2) relating to the roller 7 is expressed with the mark A, and its lower limit is 0.0281× $10^{-3}$. Further, under the conditions that the outer member outer diameter is fixed, the roller outer diameter is enlarged to a maximum and the trunnion journal diameter and the rolling element diameter are set to a minimum so that the roller wall thickness comes to a maximum, according to the calculation the upper limit comes to $1.39 \times 10^{-3}$. From this, the range of a becomes $0.0281 \times 10^{-3} < a < 1.39 \times 10^{-3}$. On the other hand, the range of the value of the conditional equation b (equation 3) concerned with the rolling elements is expressed by the mark B, and its lower limit is 0.0417. Further, on the conditions that the outer member outer diameter is fixed, the roller outer diameter is enhanced to a maximum, the trunnion diameter and the roller wall thickness are set to a minimum and the rolling element diameter is maximized, according to the calculation the upper limit amounts to 0.378. From this, the range of b is $0.0417 < b < 0.378$. Accordingly, in a manner that a and b are respectively set to within the above-mentioned ranges, the roller and the rolling elements of the constant velocity universal joint for a drive system of a motor vehicle, i.e., the whole joint, can have a sufficient strength.

Furthermore, for the purpose of improving the lubricity of the contact portions to prevent the occurrence of abrasion and peeling of the trunnion journal section, a large number of independent microscopic dents each having a recess shape were made in the surfaces of the rolling elements 6. In order to meet such a surface roughened condition, a special barrel polishing can be employed as the surface processing therefor, thus obtaining a desirable finished surface. The surface roughness of the rolling elements is Rmax 0.6 to 2.5 $\mu$m and the parameter SK value of the surface roughness is below $-1.6$. Further, the mean area of the dents is 35 to 180 $\mu m^2$ while the rate of the dents to the entire surface is 10 to 40%. The aforesaid parameter SK value denotes the skewness (strain) of the distribution curve showing the surface roughness. In the case of a symmetrical distribution such as the Gaussian distribution, the parameter SK value becomes 0, and the preferable range of the parameter SK value for providing the shape and distribution of the recesses advantageous to lubricating film formation, although depending on processing conditions, is below $-1.6$ both in the circumferential direction and in the axial direction.

FIG. 18 shows the results of the endurance tests made in terms of a tripod type constant velocity universal joint in which the outer circumferential surface of the trunnion is a true spherical surface, using the rolling elements subjected to the above-described surface processing and the conventional rolling elements experiencing a superfinishing processing. The test conditions A and B in the same illustration are respectively shown in the following table 1.

TABLE 1

| Test Condition | Bearing Load | Speed of Joint | Lubricant |
| --- | --- | --- | --- |
| A | 1438 kgf | 200 rpm | grease |
| B | 902 kgf | 500 rpm | grease |

As obvious from the test results of FIG. 18, in the case of the test condition B, the conventional rolling elements come into poor condition at the time of working for 96 hours. On the other hand, the rolling elements according to this invention are still in good condition even after the operating time exceeds more than 160% as compared with the conventional ones. Further, also in the case of the test condition A, the lifetime of the rolling elements according to this invention lengthens more than 200% as compared with the conventional ones. Thus, the above-mentioned surface processing for the rolling elements is effective for the formation of the lubricating film on the rolling element surfaces to enhance the lubricity, so that the rotating performance of the roller can improve and the sliding performance between the rolling elements and the roller and between the rolling elements and the trunnion journal can improve to reduce the occurrence of abrasion and peeling of the contact portions to the utmost.

Figure 19A:
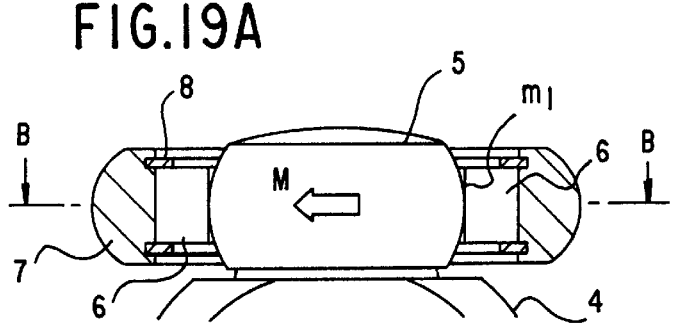
FIG. 19A is a partial enlarged illustration of the FIG. 1A joint.
Figure 19B:
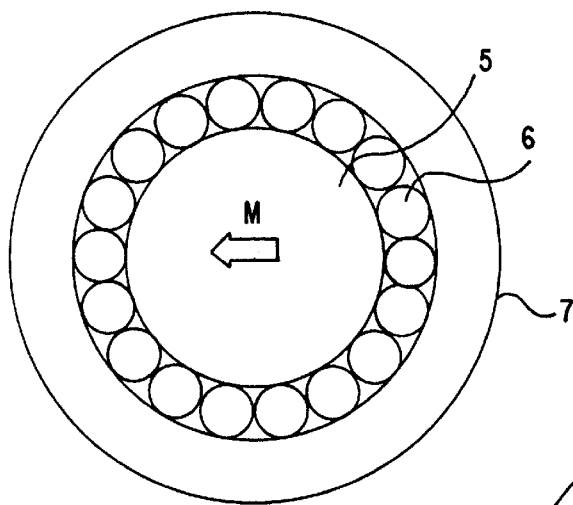
FIG. 19B is a cross-sectional view taken along a line B—B of FIG. 19A.

Secondly, approach was made to attain a higher performance in the above-described joint shown in FIGS. 1A and 1B. That is, in the case of the joint shown in FIGS. 1A and 1B, the true-spherical outer circumferential surface m of the trunnion 5 comes into point contact with the rolling elements 6 so that the surface pressure tends to heighten and the load capacity tends to decrease. The countermeasures to this problem may be enlarging the outer diameter of the trunnion 5, but resulting in excessively increasing the diameter of the whole joint. In addition, although the number of rolling elements 6 bearing the load is constant regardless of the magnitude of the working angle, as shown in FIGS. 19A and 19B a moment in a direction of a vector M due to the trunnion 5 acts through the plurality of rolling elements 6 on the roller 7, which makes the position of the roller 7 unstable, whereby difficulty is further encountered in the reduction of the induced thrust. Moreover, the stress easily concentrates on the rolling elements 6 bearing the load irrespective of the magnitude of the working angle, which has influence on the durability of the rolling elements and others.

A description will be made of an embodiment which can solve this problem inherent in the FIGS. 1A and 1B joint without increasing the joint size and the number of parts for the joint.

Figure 20A:
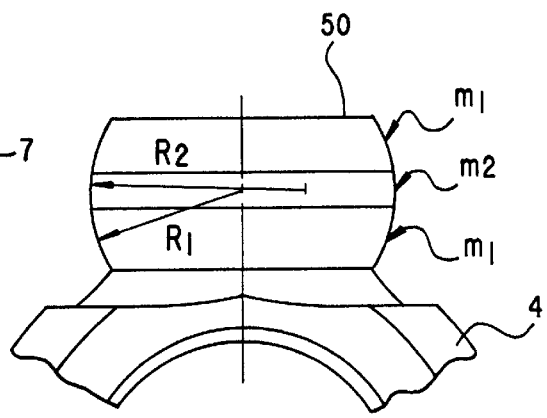
FIG. 20A is a partial front elevational view showing a tripod member.
Figure 20B:
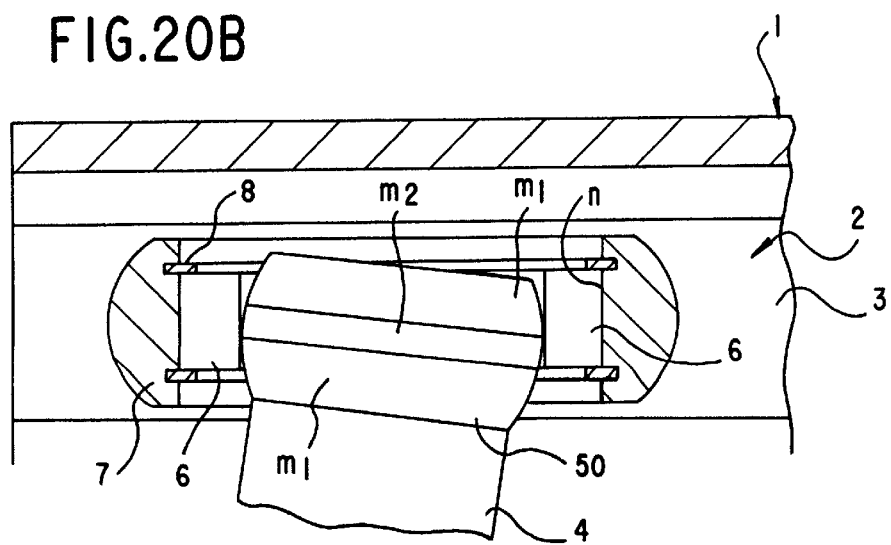
FIG. 20B is a partial sectional view showing a constant velocity universal joint incorporating the FIG. 20A tripod member.

In an embodiment shown in FIGS. 20A and 20B, an outer circumferential surface of each of three trunnions 50 (only one is shown in the illustrations) of a tripod member 4 is composed of true spherical surfaces $m_1$ having a center of curvature on the axis of the trunnion 50 and an intermediate curved surface $m_2$ standing at a central portion in the axial direction of the trunnion 50 having a radius of curvature $R_2$ larger than the radius of curvature $R_1$ of the true spherical surface $m_1$. A cylindrical inner circumferential surface n of a roller 7 is rotatably fitted through rolling elements 6 over an outer circumferential surface of the trunnion 5. The roller 7 is inserted into a track groove 2 of an outer member 1 so as to travel axially of the outer member 1 rolling on an roller guide surface 3 of the track groove 2. In this case, in other words, the generatrix for the outer circumferential surface of the trunnion 5 is defined with a combination of circular arcs ($m_1$) lying at both axial ends of the trunnion 5 and having one and same center of curvature on the axis of the trunnion 5 to constitute a part of a true circle and a circular arc ($m_2$) having a radius of curvature larger than that of the first-mentioned circular arcs ($m_1$).

The intermediate curved surface $m_2$ of the trunnion 5 signifies an area where the rolling elements 6 always come into contact at the maximum surface pressure. That is, its width (the dimension in the axial direction) is determined so that the rolling elements 6 principally bearing the load come into contact with the intermediate curved surface m2 when the tripod member 4 transmits torque at the normal working angle (approximately 2 to 10 deg) with respect to the outer member 1. The intermediate curved surface $m_2$ has a gentler curvature than that of the true spherical surface $m_1$, and it is preferable that its radius of curvature $R_2$ is approximately twice to five times the radius of curvature $R_1$ of the true spherical surface $m_1$. The maximum outer diameter of this intermediate curved surface $m_2$ is set to be smaller than the outer diameter of the true spherical surface $m_1$.

Accordingly, in the case that the rolling elements 6 come into contact with the intermediate curved surface $m_2$ when the joint operates in a state with making a working angle, its maximum surface pressure becomes lower than the maximum surface pressure arises when the rolling elements 6 come into contact with the true spherical surface $m_1$ with a smaller radius of curvature. More specifically, with the true spherical surface $m_1$ having a smaller radius of curvature $R_1$ the rolling elements 6 take a contact state closer to the point contact, while with the intermediate curved surface $m_2$ having a larger radius of curvature $R_2$ it gets into a contact state closer to the line contact, with the result that the reduction of the maximum surface pressure and the increase in the load capacity are possible so that the suppression of the induced thrust and the improvement of the durability are practicable without the increase in the diameter of the whole joint.

A modification shown in FIGS. 21A and 21B is chlaracterised in that a cylindrical surface $m_3$ is formed in an intermediate portion of the true spherical surfaces $m_1$ of the trunnion 52. In other words, the generatrix for the outer circumferential surface of the trunnion 52 is made with a combination of circular arcs ($m_l$) having a center of curvature on the axis of the trunnion 52 to constitute a part of a true circle and a straight line ($m_3$). In this instance, the straight line ($m_3$) corresponds to the aforesaid curve ($m_2$) in FIG. 20A with the radius of curvature $R_2$ made infinite. The cylindrical surface $m_3$ is in parallel to the axis of the trunnion 52 and comes into linear contact with the cylindrical rolling elements 6 and, therefore, the maximum surface pressure is more reducible. In addition, the combination configuration of the true spherical surfaces $m_1$ and the cylindrical surface $m_3$ can more easily be produced as compared with the aforesaid intermediate curved surface $m_2$.

Furthermore, in a modification shown in FIGS. 22A and 22B, the outer circumferential surface of the trunnion 53 of the tripod member 4 is characterised by being a circular arc $m_4$ having a center on the axis as viewed in a longitudinal section (FIG. 22A) but being an ellipse $m_5$ whose minor axis points the load side as viewed in a cross section (FIG. 22B). In FIG. 22B, a dashed line represents the case of a true circle. Although in FIG. 22B it is shown as being an extreme ellipse for easy understanding, the elliptical degree of the ellipse $m_5$ is approximately several tens to 100 $\mu$ in the difference between the minor axis (load side) and the major axis (non-loaded side), and all the cross sections perpendicular to the axis of the trunnion 53 assumes the same difference. Thus, since the transverse cross-sectional configuration of the trunnion 53 is made to be the ellipse $m_5$ whose minor axis points the load side, as compared with the joint as shown in FIGS. 1A and 1B the stress concentration to the rolling elements 6 which come into contact with the load side outer circumferential surface of the trunnion 53 can be lessened, whereby the maximum surface pressure is reducible and the durability is improvable.

According to the embodiment shown in FIGS. 20A and 20B, since the surface portion with a gentler curvature than the true spherical surface at both the end portions of the trunnion exists in the axial central portion of the trunnion of the tripod member, the rolling elements interposed between the trunnion and the roller are mainly brought into contact with the surface portion of the trunnion having the gentler curvature, which contributes to the reduction of the maximum surface pressure of the rolling elements and further to the suppression of the induced thrust, thus providing a tripod type constant velocity universal joint which is capable of making less vibration and creating a high durability. In the case of choosing as an example of the surface portion with a gentler curvature a cylindrical surface corresponding to a curved surface whose radius of curvature is infinite (FIGS. 21A and 21B), the surface pressure reduction is further possible. In addition, because the outer circumferential surface of the trunnion is made with a combination of a true spherical surface and a cylindrical surface, the processing is easy to cut down the manufacturing cost of the constant velocity universal joint. Besides, since the transverse cross-sectional configuration of the trunnion of the tripod member assumes an ellipse whose minor axis points the load side (FIGS. 22A and 22B), the stress concentration on the rolling elements contacting with the trunnion can be mitigated, thereby providing a tripod type constant velocity universal joint which is excellent in the reduction of the induced thrust and the durability.

Incidentally, it is also possible to add the intermediate curved surface, the cylindrical surface and the like, already described with reference to FIGS. 20A, 20B, 21A and 21B, to the axial central portion of the trunnion 54 shown in FIGS. 22A and 22B. In this case, owing to the multiplier effects of the respective structures, the durability can further improve.

Figure 23B:
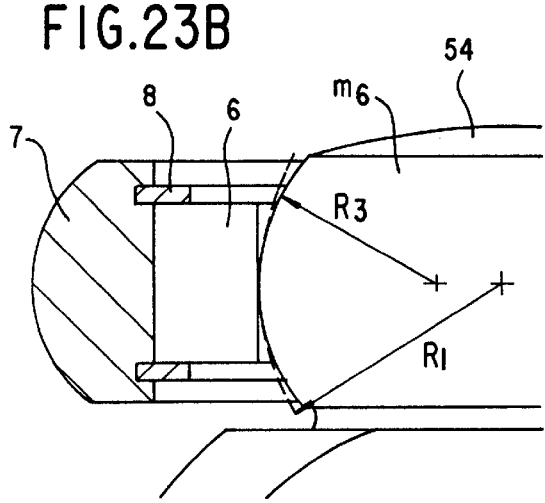
FIG. 23B is a partial sectional view showing the FIG. 23A tripod member equipped with a rolling element and a roller.
Figure 23A:
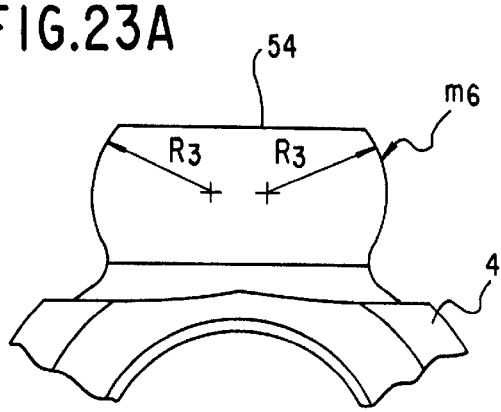
FIG. 23A is a partial front elevational view showing a tripod member.

FIGS. 23A and 23B show a modification in which the outer circumferential surface of the trunnion 54 is made to be the so-called torus surface $m_6$. For this torus surface $m_6$, a circular arc having a center at a point spaced radially outwardly from the axis of the trunnion 54 and having a radius $R_3$ is used as the generatrix and the axial central portion of the trunnion 54 assumes the largest outer diameter ($2R_1$). Although the structure shown in FIGS. 23A and 23B goes against the surface pressure reduction, the torus surface $m_6$ of the trunnion 6 comes into contact with the rolling element 6 with a frictional resistance smaller than that in the case of a true spherical surface (for comparison, a circular arc $R_1$ having a center of curvature on the axis of the trunnion 54 is indicated with a dotted line in FIG. 23B), with the result that the suppression of the induced thrust becomes easier. In addition, when the joint operates in a state with making a working angle, the number of rolling elements 6 bearing the load decreases in accordance with the difference in radius [$R_1$–$R_3$], and accordingly the vector M direction moment receiving from the trunnion 54 and working on the roller 7 decreases to stabilize the position of the roller 7 as compared with the case of the true spherical surface, with the result that the induced thrust is reducible. In this case, it is necessary that the difference in radius [$R_1$–$R_3$] is set to approximately 1 to 2 mm so as not to increase the surface pressure.

Figure 24:
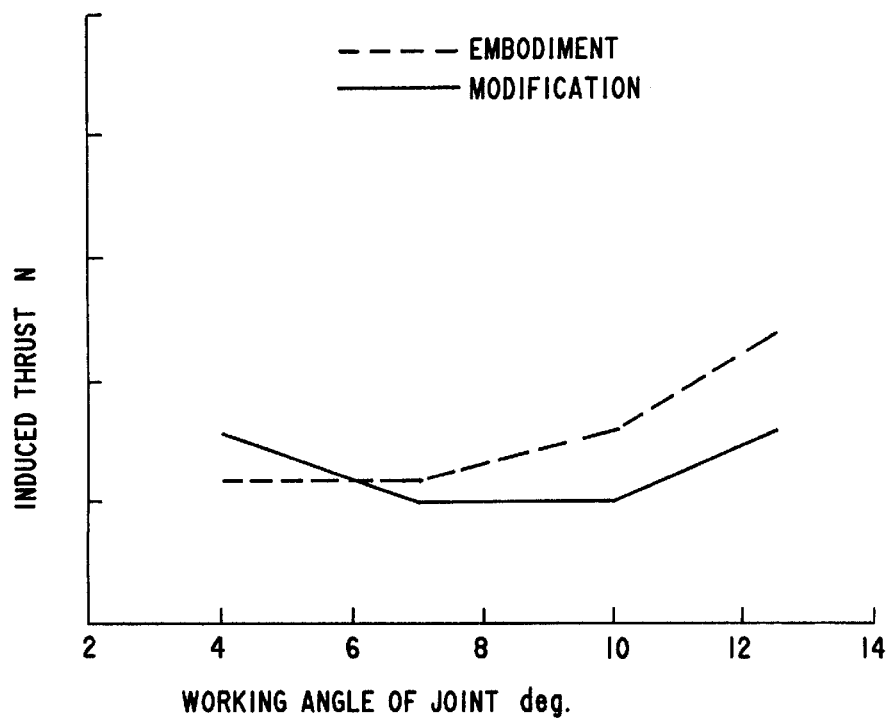
FIG. 24 shows polygonal lines obtained by plotting experimental data, i.e. induced thrust relative to joint working angle.

FIG. 24 shows the results of the measurement of the induced thrust in the case of the embodiment shown in FIGS. 1A and 1B and the modification shown in FIGS. 23A and 23B. In this case, in the modification the outer circumferential surface of the trunnion 54 is the torus surface $m_6$ of the maximum radius $R_1$=19.095 mm and the generatrix radius $R_3$=17.85 mm, while in the embodiment of FIGS. 1A and 1B the outer circumferential surface of the trunnion is a true spherical surface having the radius of curvature of 19.095 mm. As shown in FIG. 24, the induced thrust takes the relation of the embodiment<the modification until the working angle taken when in operation rises up to approximately 6 deg, while in the range of the working angle exceeding 6 deg the induced thrust takes, on the contrary, the relation of the embodiment>the modification.

Accordingly, in the case of the structure shown in FIGS. 23A and 23B, if the curvature of the intermediate portion of the torus surface $m_6$ coming into contact with the rolling elements 6 in the range of the working angle within 6 deg is made to be relaxed to approximately the curvature of the true spherical surface so that this intermediate portion becomes similar to the intermediate curved surface or the cylindrical surface in the embodiment shown in FIGS. 1A and 1B or FIG. 2, even if the working angle is below 6 deg, the induced thrust is reducible up to those in the above-described embodiments or to below those values.

Figure 8A:
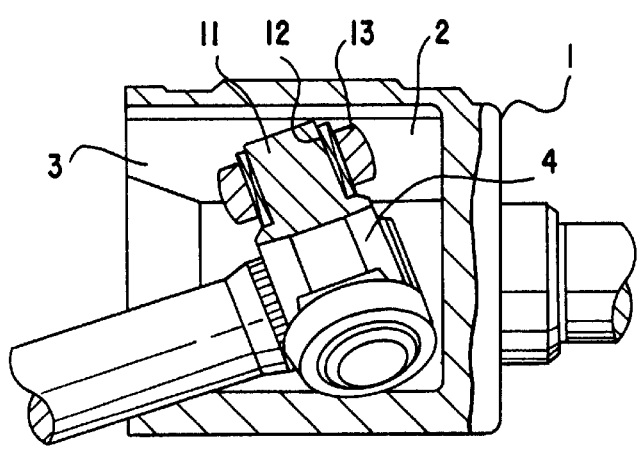
FIG. 8A is a longitudinal sectional view showing a conventional tripod type constant velocity universal joint.
Figure 8B:
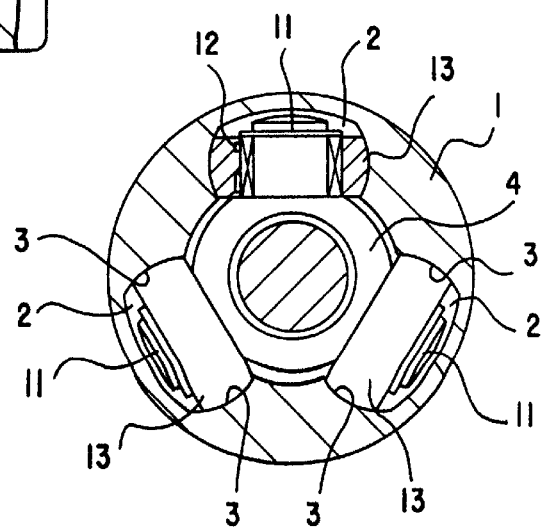
FIG. 8B is a cross-sectional view of the FIG. 8A joint.
Figure 8C:
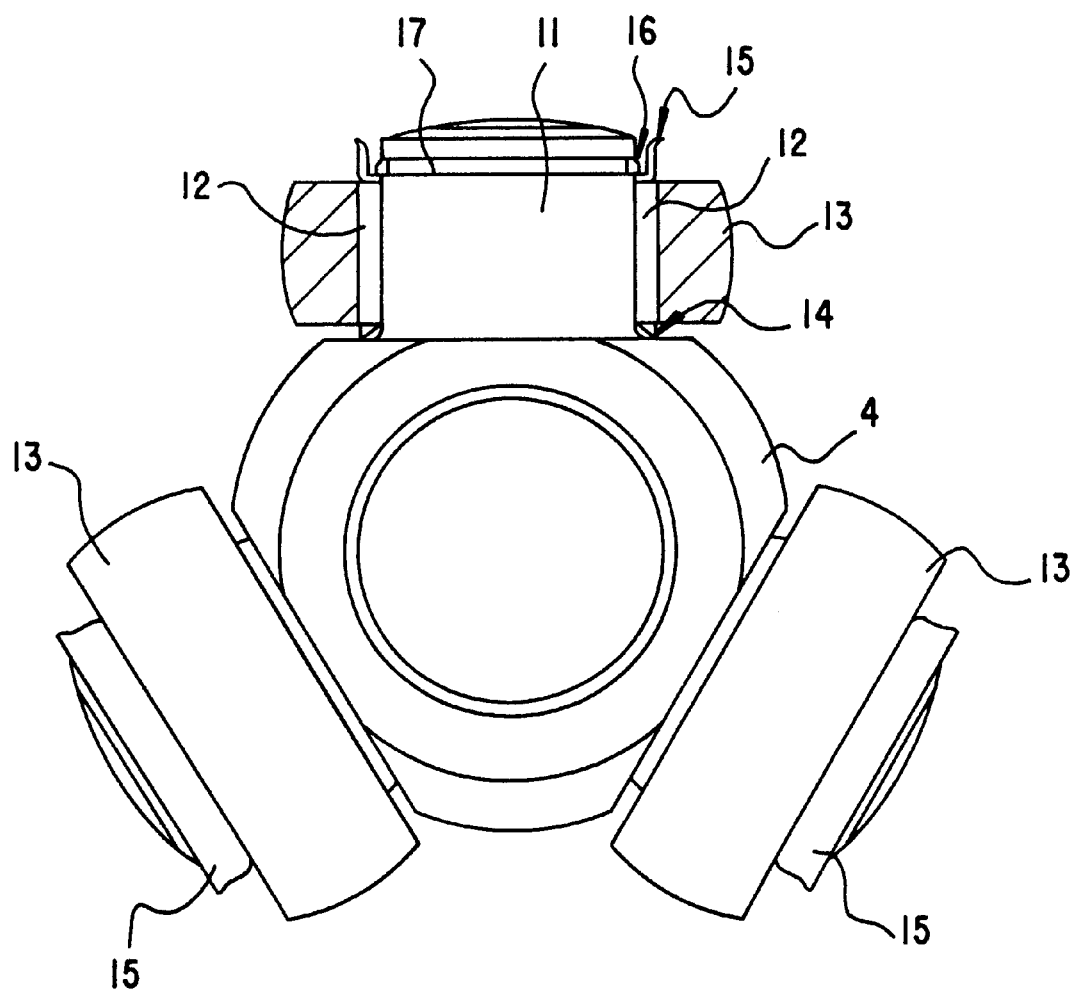
FIG. 8C is an enlarged front elevational view in part in section of a tripod member of the FIG. 8B joint.
Figure 9:
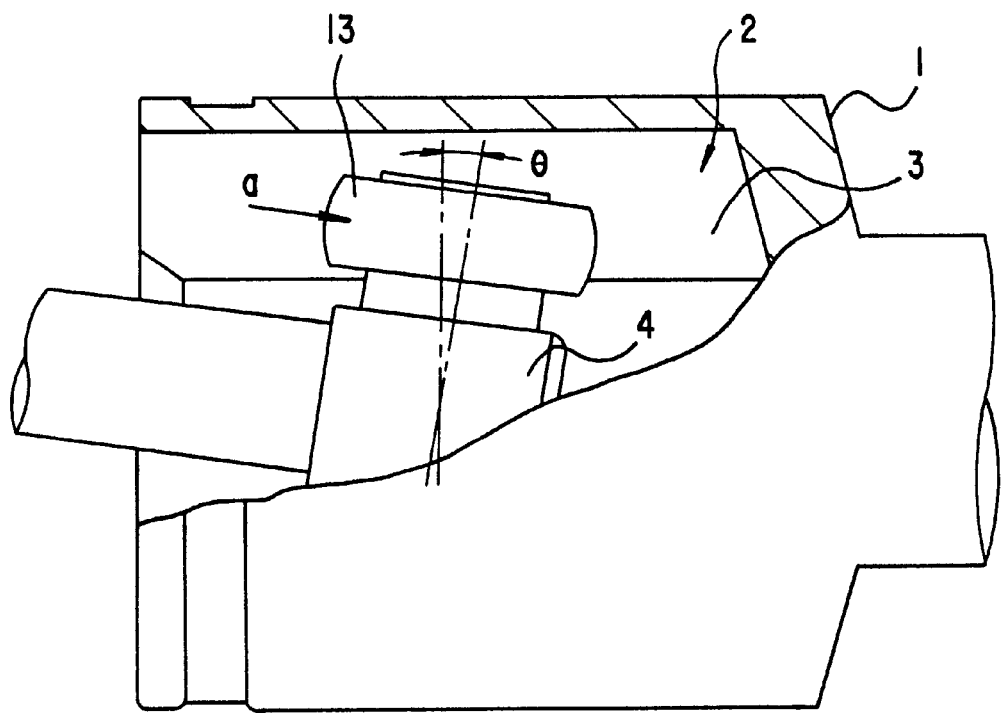
FIG. 9 is a front elevational view in part in section of the FIG. 8A joint in a state with making a working angle.
Figure 10:
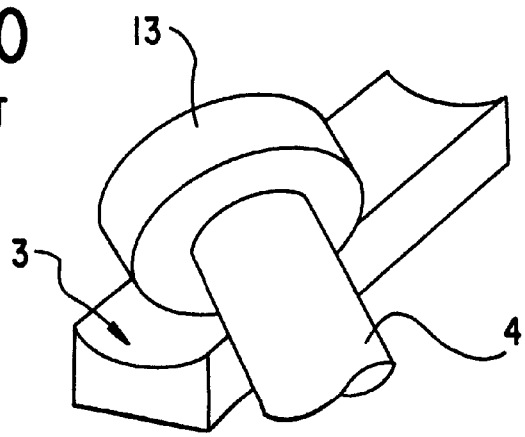
FIG. 10 is a perspective view showing a rolling state of a roller in the FIG. 9 joint.

Conventionally, the outer circumferential surface of the trunnion 11 of the tripod member 4 is, for example, a cylindrical surface as shown in FIG. 8C, and an inner washer 14 is fitted over the proximal portion of this cylindrical surface and an outer washer 15 and a clip 16 are fitted over the tip portion thereof, and further a plurality of rolling elements are placed between both the washers 14, 15. The plurality of rolling elements 12 are serially arranged along the outer circumference of the trunnion 11 without making gaps therebetween. The outer washer 15 is placed into contact with an end surface of the rolling elements 12 to limit the axial position of the rolling elements 12 and further to prevent them from falling out. The clip 16 is fitted in a groove 17 made in the outer circumference of the trunnion 11 to fix the outer washer 15 against the trunnion 11. For assembling a tripod member 4 shown in FIG. 8C, a plurality of rolling elements 12 are successively arranged on the outer circumference of the trunnion 11 and then a roller 13 is fitted over them, or alternatively, the roller 13 is fitted over the trunnion 11 and the plurality of rolling elements are inserted into an annular space formed between the trunnion 11 and the roller 13. However, both the cases require a large number of steps for assembling and are hard to assemble, thus deteriorating the assembling working efficiency of the tripod type constant velocity universal joint. Further, the outer washer 15 for preventing the rolling elements mounted on the trunnion 11 from falling out is required to have a special shape as shown in the illustration for also preventing the roller 13 from coming out, and the clip 16 for setting the outer washer 15 on the trunnion 11 is additionally necessary, with the result that the number of parts for the tripod member 4 and the number of assembling steps become many so that difficulty is encountered to lower the manufacturing cost thereof.

Referring now to FIGS. 25 to 31 a description will be made hereinbelow of a tripod type constant velocity universal joint according to an embodiment of this invention which can eliminate the above-mentioned problems and which is capable of improving the assembling working efficiency and lowering the manufacturing cost.

Figure 25:
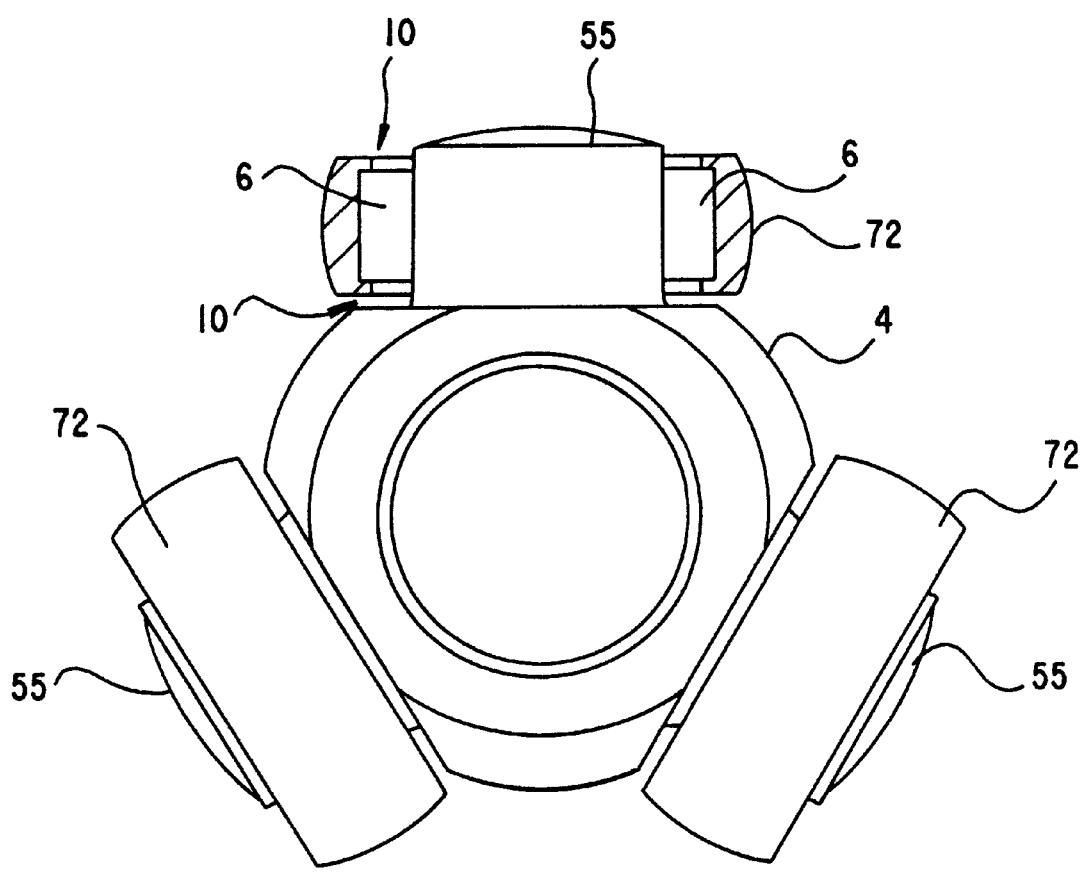
FIG. 25 is a front elevational view in part in section of a tripod member.

In a tripod member 4 shown in FIG. 25, a stopper 10 for preventing a plurality of rolling elements 6 from falling out is formed on an inner circumferential surface of a roller 72 fitted through the rolling elements 6 over the outer circumference of each of trunnions 55. For example, the outer circumferential surface of the trunnion 55 is a cylindrical surface, and a plurality of cylindrical rolling elements 6 such as rollers and needle rollers are serially disposed on this cylindrical outer circumferential surface without defining gaps therebetween, and the cylindrical inner circumferential surface of the roller 72 is located around these rolling elements 6.

Figure 26A:
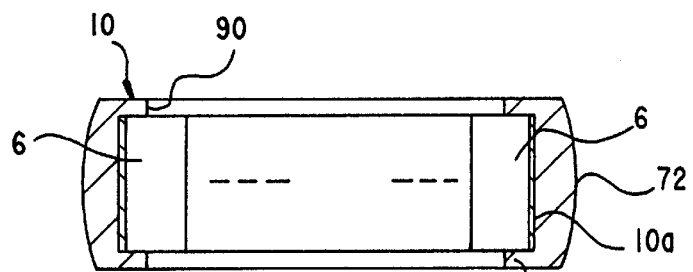
FIG. 26A is an enlarged sectional view showing a roller and rolling elements of the FIG. 25 tripod member.
Figure 26B:
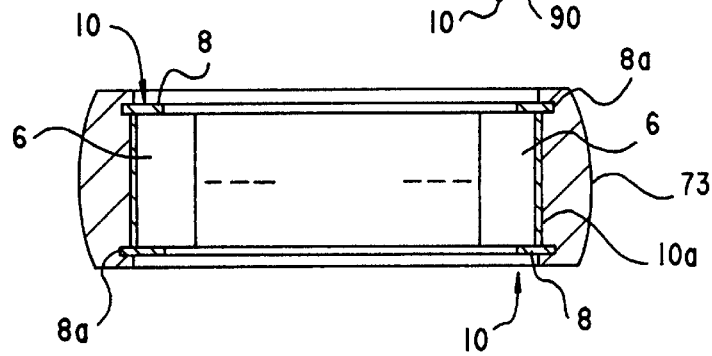
FIG. 26B is an enlarged sectional view showing rolling elements and a roller with another construction in the FIG. 25 tripod member.

Concrete examples of the stoppers 10 to be formed on the cylindrical inner circumferential surface of the roller 72 are shown in FIGS. 26A and 26B. In FIG. 26A, the stoppers 10 are in the form of a pair of annular step portions 90 formed at both ends of the roller 72 to protrude from the cylindrical inner circumferential surface of the roller 72. For instance, a groove for accommodating the rolling elements 6 for rolling motion is formed in a central section of the cylindrical inner circumferential surface of the roller 72 so that the axial end portions thereof define the inwardly protruding annular steps 90. Alternatively, in FIG. 26B, the stoppers 10 are in the form of a pair of washers 73 fitted in grooves 8a formed in both axial end portions of the cylindrical inner circumferential surface of the roller 72. The protruding amount of the washer 8 from the roller cylindrical inner circumferential surface corresponds to the step (difference in level) of the annular step 90 in FIG. 26A.

Figure 27:
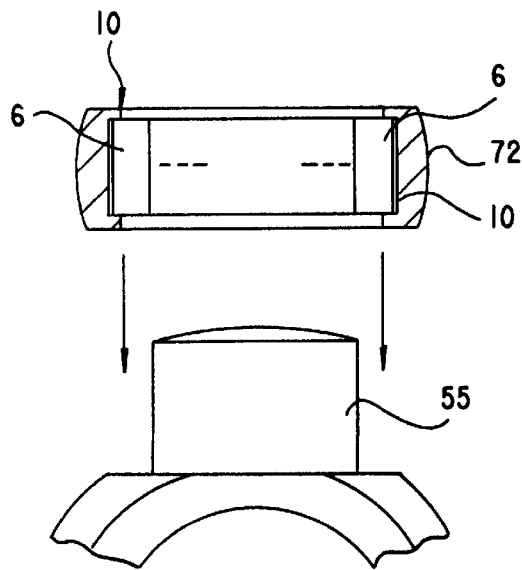
FIG. 27 is an illustration for describing an assembling procedure for the FIG. 25 tripod member.
Figure 28:
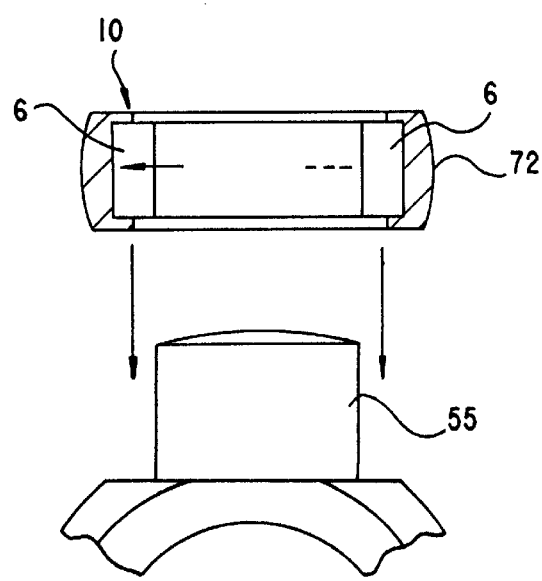
FIG. 28 is an illustration for describing another assembling procedure for the FIG. 25 tripod member.

Thanks to the provision of the rolling element falling-out preventing stoppers 10 on the cylindrical inner circumferential surface of the roller 72, the assembling ways as shown in FIGS. 27 and 28 are selectively acceptable.

When attaching the roller 72 of FIG. 26A to the trunnion 55, as shown in FIG. 27 the roller 72, together with the rolling elements 6, is fitted over the trunnion 55 in a state where all the rolling elements 6 are serially arranged along and temporarily adhered to the cylindrical inner circumferential surface of the roller 72 with a grease 10a. The grease 10a is of the well-known type for lubricating the rolling elements, and this grease 10a is applied in advance to the cylindrical inner circumferential surface of the roller 72 to make a desired thickness thereon and the rolling elements 6 are pressed against the applied grease 10a so that the plurality of rolling elements 6 are subjected to the temporary adhesion. Thereafter, the roller 72, together with the rolling elements 6, is fitted over the cylindrical outer circumferential surface of the trunnion 55, with the result that the stoppers 10 (9) of the roller 72 prevent the rolling elements 6 from coming out and the attachment of the roller 72 and the rolling elements 6 to the trunnion 55 can surely and smoothly be done.

Figure 29A:
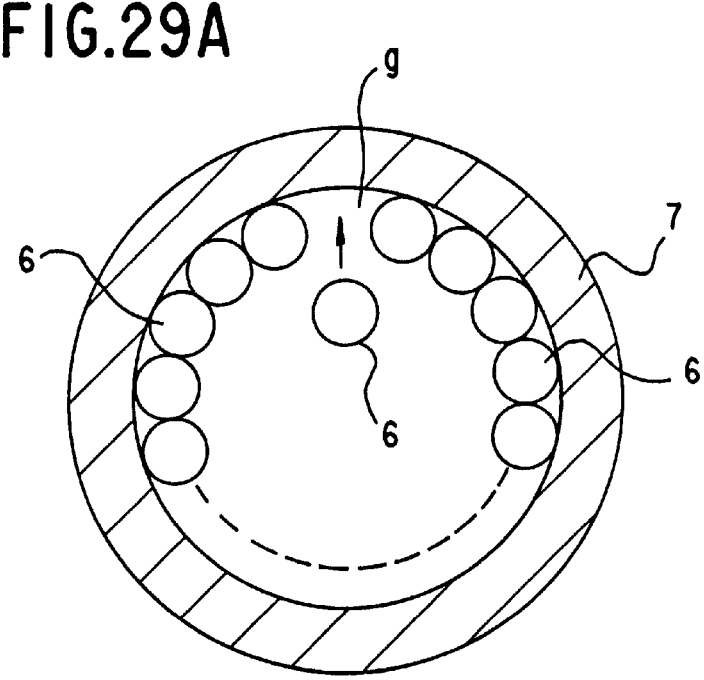
FIG. 29A is an illustration for describing an incorporating procedure for rolling elements for the FIG. 28 roller.
Figure 29B:
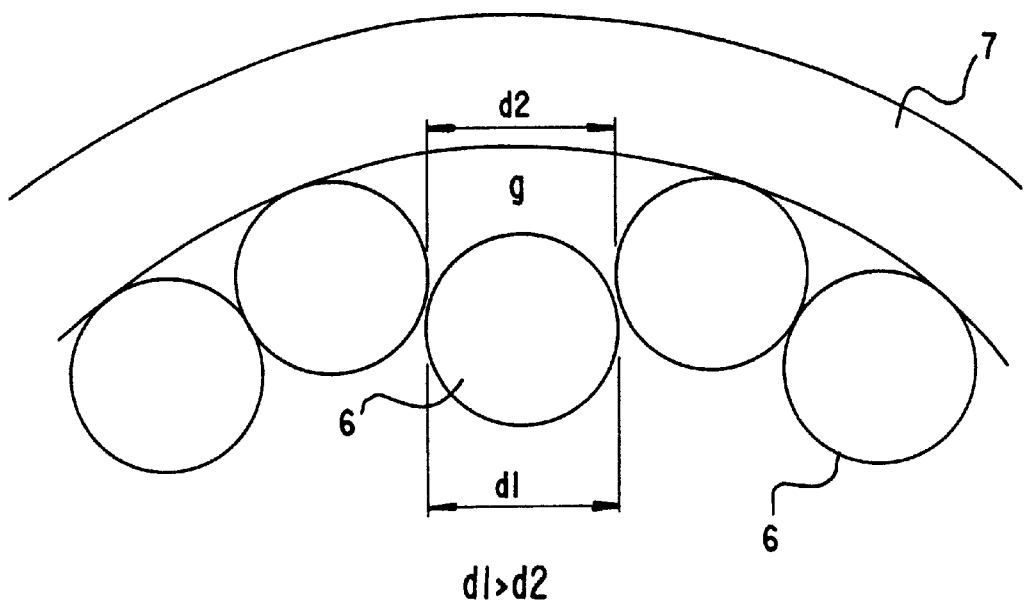
FIG. 29B is an enlarged view showing a portion of FIG. 29A.

FIG. 28 shows a method in which the roller 72, together with a plurality of rolling elements 6, is mounted over the trunnion 55 in a state that the rolling elements 6 are temporarily serially attached to the cylindrical inner circumferential surface of the roller 72 according to the so-called Keystone method. For example, as shown in FIGS. 29A and 29B all the rolling elements 6 but one are serially arranged on the cylindrical inner circumferential surface of the roller 72, and the last one 6 is forced into a gap g defined between the two of this series of rolling elements 6 positioned at both the ends thereof. In this case, the relation between the diameter $d_1$ of the rolling elements 6 and the minimum separation $d_2$ of the gap g is set to be $d_1 > d_2$, the difference $[d_1 - d_2]$ being an interference of several $\mu$ to several tens $\mu$. Thus, now that the last one rolling element 6 is fitted in the gap g under pressure, all the rolling elements 6 are temporarily and serially held on the cylindrical inner circumferential surface of the roller 72. Also in the case of FIG. 28, when the roller 72, together with the rolling elements 6, is fitted over the cylindrical outer circumferential surface of the trunnion 5, the stoppers 10 (9) of the roller 72 prevent the falling-out of the rolling elements 6 and the mounting of the roller 72 and the rolling elements 6 on the trunnion 55 is surely and smoothly achievable. In addition, the plurality of rolling elements 6 attached in advance to the roller 72 according to the Keystone method can smoothly rotate between the roller 72 and the trunnion 55 with no problem as long as having the above-mentioned interference.

As described above, the work for setting the unit, in which the rolling elements 6 are combined with the roller 72, to the trunnion 5 to assemble the tripod member 4 is technically easier as compared with the conventional assembling work, and its number of working steps for assembling decreases, thus further improving the assembling working efficiency. In addition, in the case that like the roller 72 as shown in FIG. 26A the stoppers 10 are integrally formed on the roller cylindrical inner circumferential surface, since it is possible to omit the washers or clips for preventing the rolling elements fitted over the trunnion from falling out, the number of parts for the tripod member 4 and the number of steps for assembling are reducible, thus easily cutting down the manufacturing cost.

Also in the case that like the roller 73 shown in FIG. 26B the stoppers 10 are constructed using the washers 8, it is possible to assemble the tripod member through the use of the adhering method based on the grease in FIG. 27 and through the use of the Keystone method in FIG. 28. In the roller 73 of FIG. 26B, since the pair of washers 8 is employed in order to prevent the rolling elements from falling out, although there is no effect to cut down the number of parts, the washers 8 can be constructed with cheap flat washers with a simple configuration which merely protrude from the cylindrical inner circumferential surface of the roller 73, so that it is possible to cut down the manufacturing cost of the tripod member.

Figure 30:
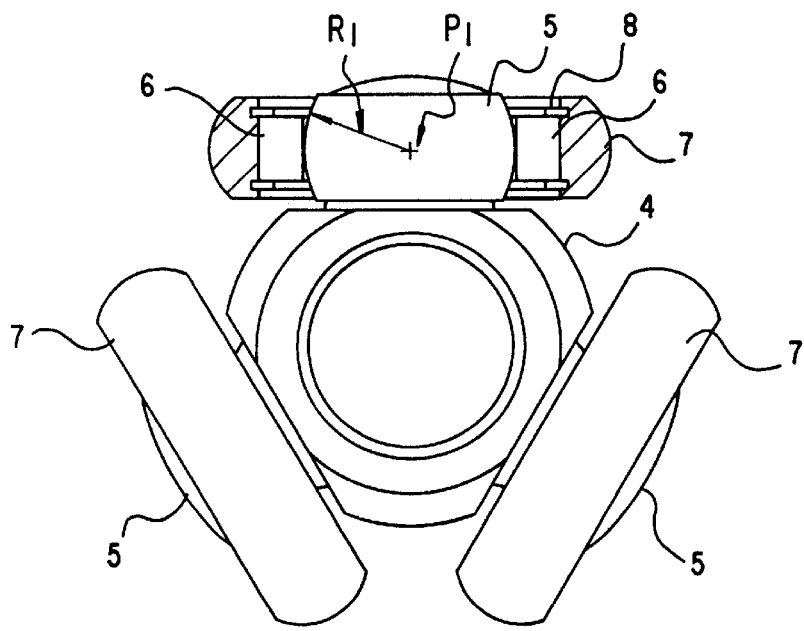
FIG. 30 is a front elevational view similar to FIG. 25, showing in part in section a tripod member.
Figure 31:
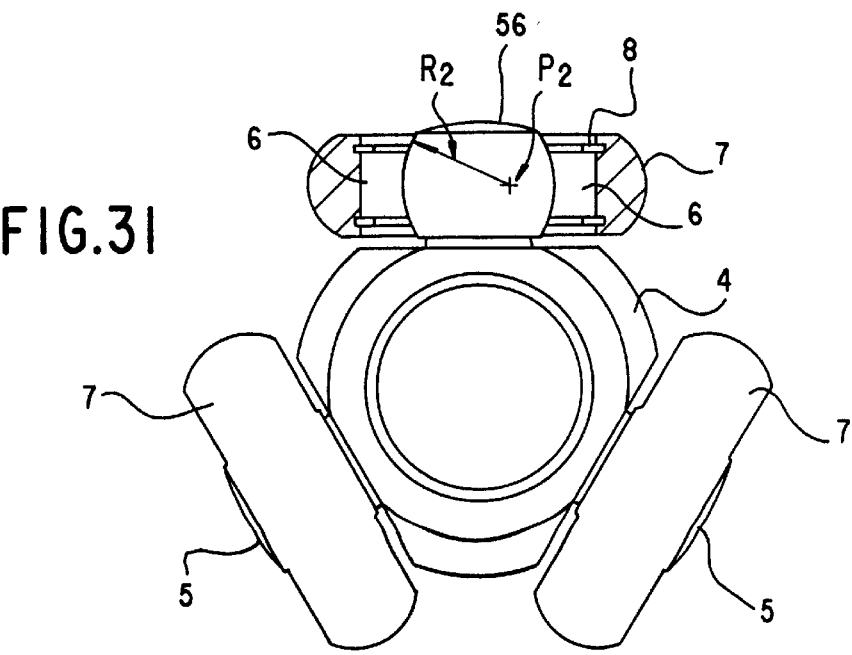
FIG. 31 is a front elevational view similar to FIG. 25, showing in part in section a tripod member.

The structure of the tripod member and the assembling method thereof described with reference to FIGS. 25 to 28, 29A and 29B are also applicable to the embodiment of FIGS. 1A and 1B, the modifications thereof, the embodiment of FIGS. 20A and 20B and the modifications thereof with the same effects. For example, the outer circumferential surface of the trunnion 5 of the tripod member 4 shown in FIG. 30 is a true spherical surface having its center $P_1$ on the axis of the trunnion 5 and having a radius $R_1$, and the rolling members 6 are brought into point contact with this true spherical surface to be slidable, and further the roller 7 is pivotably mounted relative to the trunnion 56. Further, the outer circumferential surface of the trunnion 56 of the tripod member 4 shown in FIG. 31 has a circular generatrix whose center $P_2$ is separated from the axis of the trunnion 5 and whose radius is $R_2$. The rolling elements 6 are placed into point contact with this outer circumferential surface to be slidable, and the roller 7 is pivotably mounted relatively to the trunnion 56.

Figure 16:
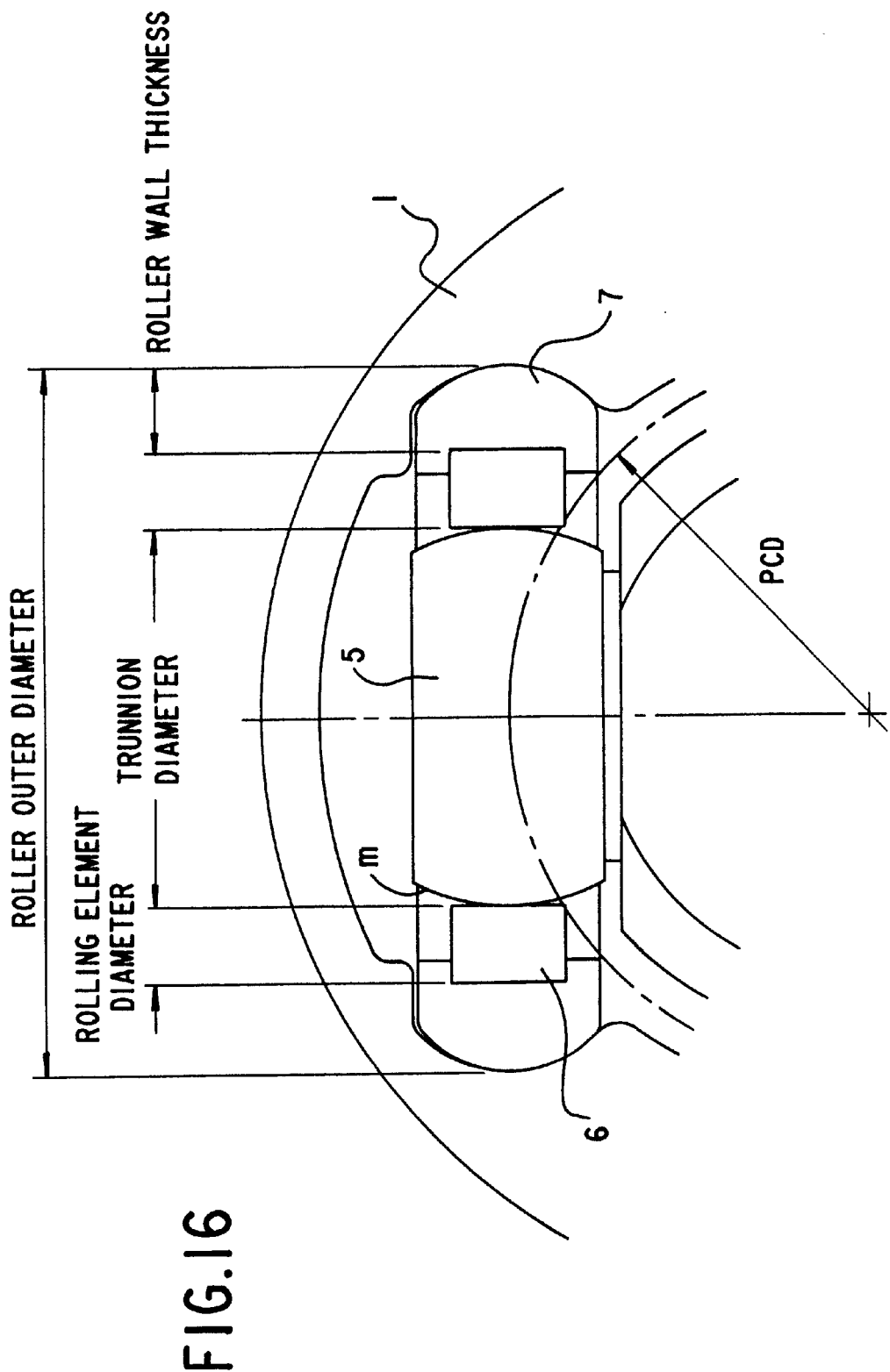
FIG. 16 is a cross-sectional view showing a principal portion of a joint for describing dimensions.
Figure 32:
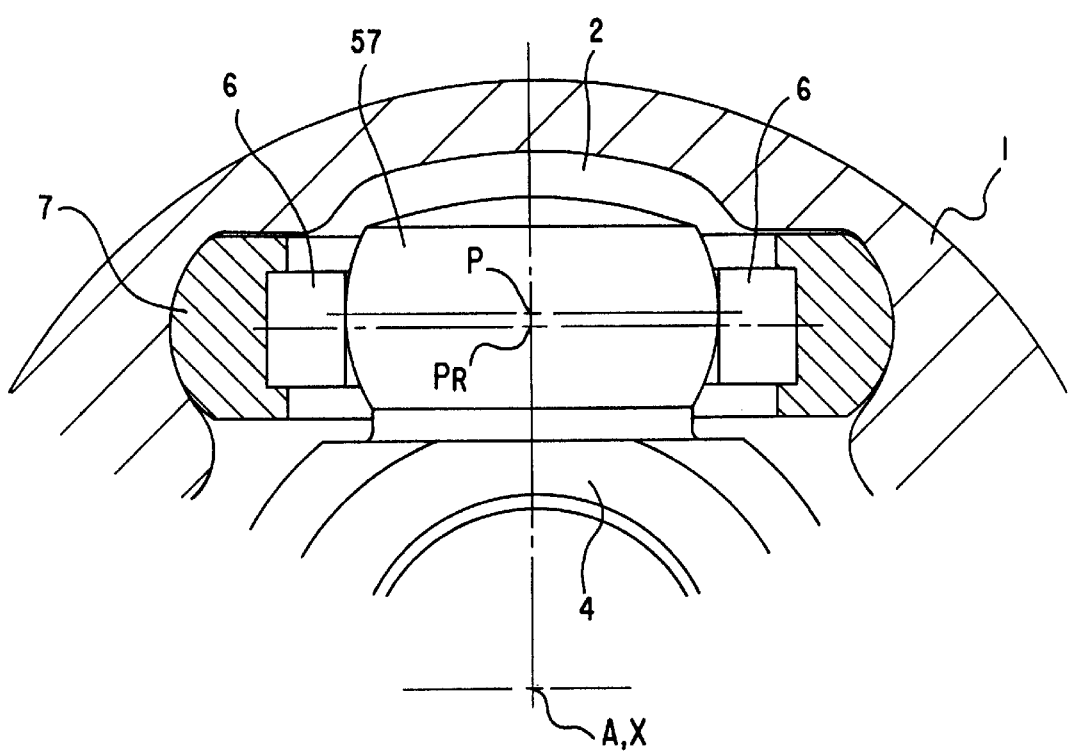
FIG. 32 is a sectional view similar to FIG. 16, showing a modification in which the centers of the trunnion and the roller are offset.

Taking FIGS. 4 and 16 for example, the center of the trunnion 5 and the center of the roller 7 are shown as coexisting with each other as at point P even when the two axes being coupled together by the joint are not at an angle, though, they may be offset axially of the trunnion 5. When the axes being coupled by the joint are at an angle, the center P of the trunnion 5 shifts towards the axis X of the outer member 4, i.e., from P to P', as previously described in conjunction with FIG. 4, and therefore, the centers of the trunnion 5 and roller 7 are offset axially of the trunnion 7. In order to obviate such problem, as shown in FIG. 32, the center $P_R$ of the roller may be spaced apart from the center P of the trunnion 57 by a predetermined amount towards the axis X of the outer member 4; this ensures that when the axes being coupled by the joint are at an angle, the center P of the trunnion 57 shifts towards the axis X of the outer member 1 to coincide with or approach the center of the roller 7. This arrangement takes account of the movements encountered by the components of the joint in transmitting torque between the two rotary axes which are at an angle, and its significance will be apparent in view of the fact that in the joint of this kind the two rotary axes being coupled are usually at an angle.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

We claim:

1. A tripod type constant universal joint wherein rollers rotatably carried, through cylindrical rolling elements, on three trunnions of a tripod member are accommodated, respectively, in track grooves formed in an inner circumferential surface of an outer member in an axial direction, so that the rollers are movable axially of the outer member along roller guide surfaces at opposite sides of each of the track grooves and extending axially of the outer member, wherein an inner circumferential surface of the roller is cylindrical, and wherein a generatrix of an outer circumferential surface of the trunnion is defined with a combination of circular arcs at opposite ends of the trunnion and a curve between the circular arcs, the circular arcs having one and the same center of curvature on the axis of the trunnion to constitute a part of a true circle, the curve having a radius of curvature substantially equal to or larger than that of the circular arcs to be smoothly joined to the circular arcs.

2. The joint as defined in claim 1, wherein said curve is defined with a combination of a plurality of circular arcs different in center of curvature and radius of curvature from each other.

3. The joint as defined in claim 1, wherein said curve is a substantially straight line with an infinite radius of curvature.

4. The joint as defined in claim 1, wherein the outer circumferential surface of said trunnion assumes a true spherical surface having its center of curvature on the axis of said trunnion.

5. The joint as defined in claim 1, 2, 3 or 4, wherein said roller guide surfaces and the outer circumferential surface of each of said rollers are brought into angular contact with each other.

6. The joint as defined in claim 1, 2, 3 or 4, wherein a shoulder is formed along each of the roller guide surfaces to engage with an end surface of said roller, the shoulder extending in parallel to the track groove, thereby allowing said roller to roll in a direction parallel to the track groove.

7. The joint as defined in claim 1, wherein the value of geometrical moment of inertia of said roller divided by the fourth power of a pitch diameter is set to exceed 0.0281 multiplied by the minus third power of 10 but less than 1.39 multiplied by the minus third power of 10 and the value of rolling element diameter divided by a pitch diameter is set to exceed 0.0417 but less than 0.378.

8. The joint as defined in claim 1, wherein a cross section of the trunnion is an ellipse with a minor axis pointing a load side.

9. The joint as defined in claim 1, wherein said roller has a means for preventing the cylindrical rolling elements from falling out in their axial direction.

10. The joint as defined in claim 9, wherein said means is in the form of an annular step inwardly protruding form the inner circumferential surface of said roller.

11. The joint as defined in claim 9, wherein said means is in the form of a washer fitted in an annular groove formed in the inner circumferential surface of said roller.

12. A method of manufacturing a tripod type constant velocity universal joint wherein rollers rotatably carried, through cylindrical rolling elements, on three trunnions of a tripod member are accommodated, respectively, in track grooves formed in an inner circumferential surface of an outer member in an axial direction, so that the rollers are movable axially of the outer member along roller guide surfaces at opposite sides of each of the track grooves and extending axially of the outer member, said method comprising the steps of:

provided a stopper on an inner circumferential surface of said roller to prevent said plurality of cylindrical rolling elements from falling out in their axial direction, serially arranging said plurality of rolling elements but one on said roller inner circumferential surface along said stopper, forcing the last one rolling element into a gap between the two of both ends of the serially arranged rolling elements, and fitting said roller, together with said plurality of rolling elements, over said trunnion.

* * * * *